United States Patent
Blomqvist et al.

(10) Patent No.: US 11,561,097 B2
(45) Date of Patent: Jan. 24, 2023

(54) MULTIAXIS GYROSCOPE WITH SUPPLEMENTARY MASSES

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI); Mikko Partanen, Vantaa (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/328,754

(22) Filed: May 24, 2021

(65) Prior Publication Data

US 2021/0364293 A1 Nov. 25, 2021

(30) Foreign Application Priority Data

May 25, 2020 (FI) .................................... 20205526

(51) Int. Cl.
*G01C 19/5747* (2012.01)
(52) U.S. Cl.
CPC ................. *G01C 19/5747* (2013.01)
(58) Field of Classification Search
None
See application file for complete search history.

(56) References Cited

U.S. PATENT DOCUMENTS

| 7,227,432 B2 | 6/2007 | Lutz et al. |
| 7,228,738 B2 | 6/2007 | Acar et al. |
| 7,595,708 B2 | 9/2009 | Lutz et al. |

(Continued)

FOREIGN PATENT DOCUMENTS

| DE | 10 2017 130384 A1 | 6/2018 |
| JP | 2008-545333 A | 12/2008 |

(Continued)

OTHER PUBLICATIONS

Finnish Search Report dated Jan. 15, 2021 corresponding to Finnish Patent Application No. 20205526.

(Continued)

*Primary Examiner* — Paul M. West
*Assistant Examiner* — Mark A Shabman
(74) *Attorney, Agent, or Firm* — Squire Patton Boggs (US) LLP

(57) ABSTRACT

A gyroscope with a first Coriolis mass quartet and a second Coriolis mass quartet arranged around two quartet center points, and two elongated mass elements or synchronization bars aligned with each other outside of each Coriolis mass. One end of each elongated mass element and synchronization bar is attached to the corresponding Coriolis mass. Each elongated mass element is suspended from a peripheral anchor point by a mass element suspension arrangement which allows said elongated mass element to undergo rotational motion both in the device plane and out of the device plane. Each elongated synchronization bar is suspended from a peripheral anchor point by a synchronization bar suspension arrangement which allows said elongated synchronization bar to undergo rotational motion both in the device plane and out of the device plane substantially around its midpoint.

5 Claims, 19 Drawing Sheets

| 11 | → | primary mode |
| 12 | ⇒ | secondary mode in z-axis rotation |
| 13 | ⊕ ⊙ | secondary mode in x-axis rotation |
| 14 | ⊗ ⊙ | secondary mode in y-axis rotation |

(56) References Cited

U.S. PATENT DOCUMENTS

| | | | |
|---|---|---|---|
| 8,322,213 B2* | 12/2012 | Trusov | G01C 19/5747 |
| | | | 73/504.12 |
| 9,052,194 B2* | 6/2015 | Seeger | G01C 19/5719 |
| 10,697,774 B2 | 6/2020 | Prikhodko et al. | |
| 11,280,610 B2 | 3/2022 | Kuisma | |
| 2004/0211257 A1* | 10/2004 | Geen | G01P 15/125 |
| | | | 73/504.04 |
| 2008/0282833 A1 | 11/2008 | Chaumet | |
| 2010/0313657 A1 | 12/2010 | Trusov et al. | |
| 2012/0060604 A1* | 3/2012 | Neul | G01P 3/44 |
| | | | 73/504.12 |
| 2015/0000400 A1* | 1/2015 | Cazzaniga | G01C 19/5747 |
| | | | 73/504.12 |
| 2015/0128700 A1 | 5/2015 | Neul | |
| 2015/0330783 A1* | 11/2015 | Rocchi | G01C 19/5769 |
| | | | 73/504.12 |
| 2018/0172446 A1* | 6/2018 | Prikhodko | G01C 19/567 |
| 2018/0172447 A1* | 6/2018 | Prikhodko | G01C 19/574 |
| 2019/0346265 A1 | 11/2019 | Kuisma | |

FOREIGN PATENT DOCUMENTS

| | | |
|---|---|---|
| JP | 2008-545988 A | 12/2008 |
| JP | 2018-100966 A | 6/2018 |
| JP | 2020-064054 A | 4/2020 |

OTHER PUBLICATIONS

Partial European Search Report dated Feb. 11, 2022 corresponding to European Patent Application No. 21169404.

English translation of Notice of Reasons for Refusal dated Aug. 2, 2022 corresponding to Japanese Patent Application No. 2021-981418.

* cited by examiner

| | |
|---|---|
| 11 | ⇧ primary mode |
| 12 | ⬆ secondary mode in z-axis rotation |
| 13 | ⊕ secondary mode in x-axis rotation |
| 14 | ⊗ secondary mode in y-axis rotation |

Fig. 1

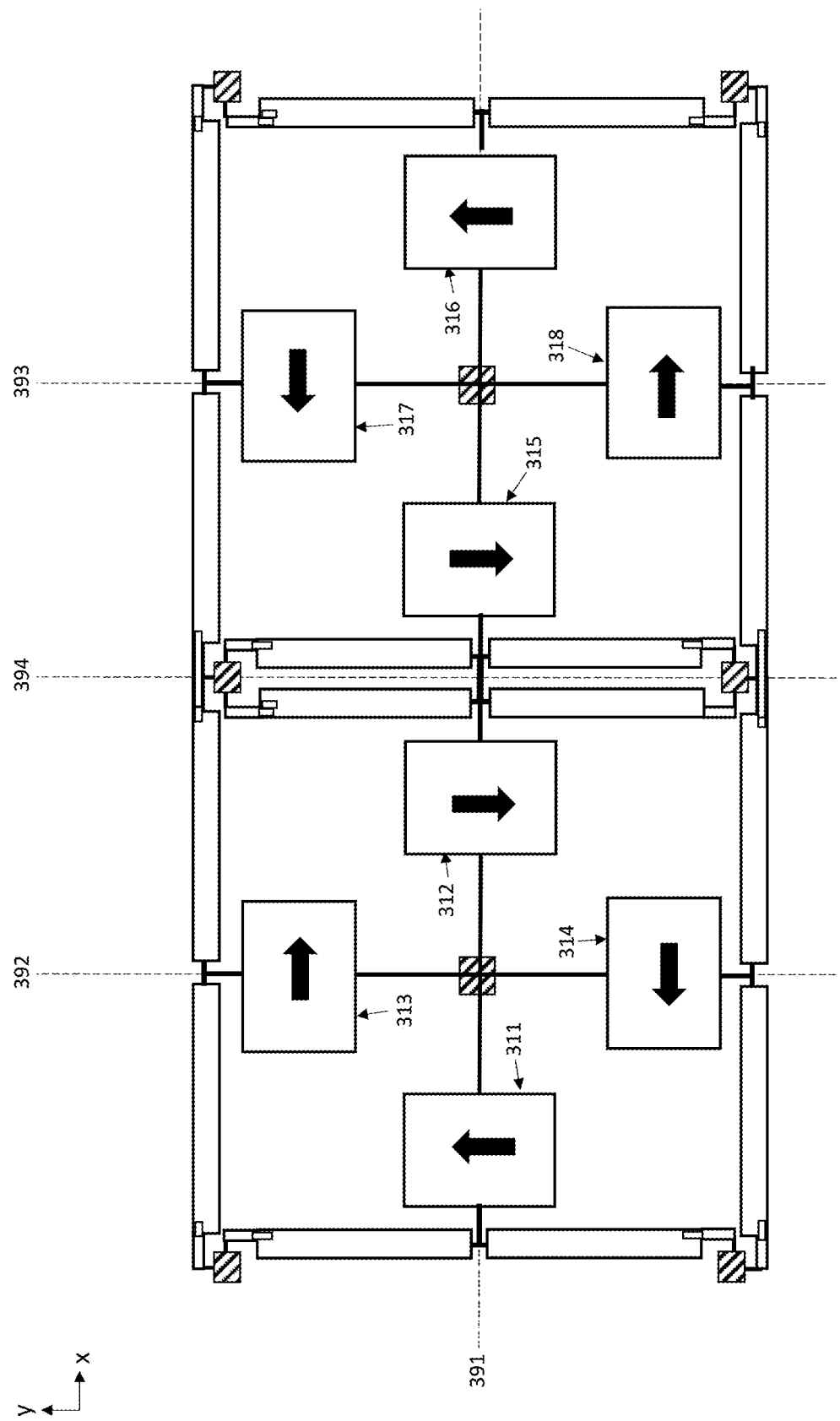

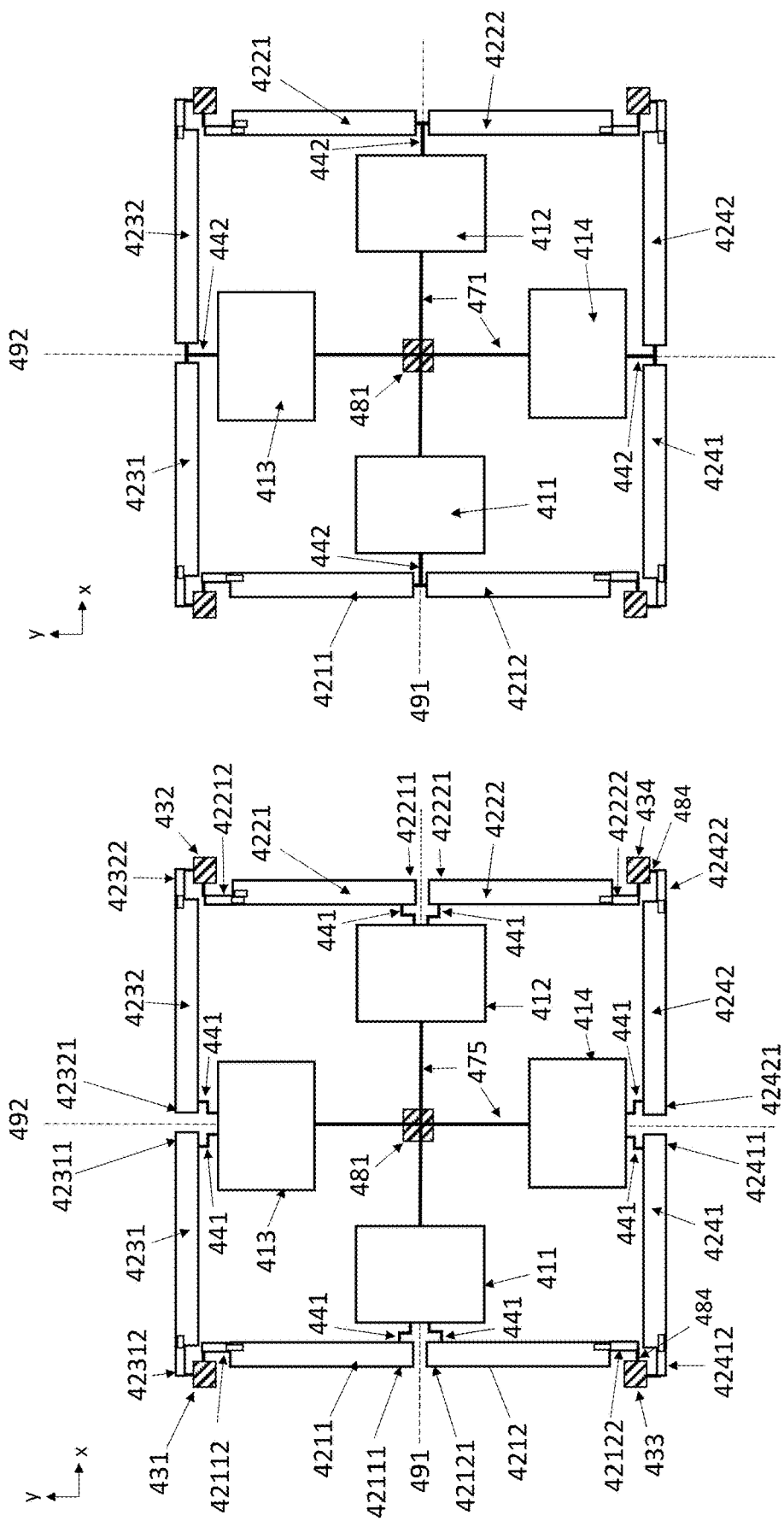

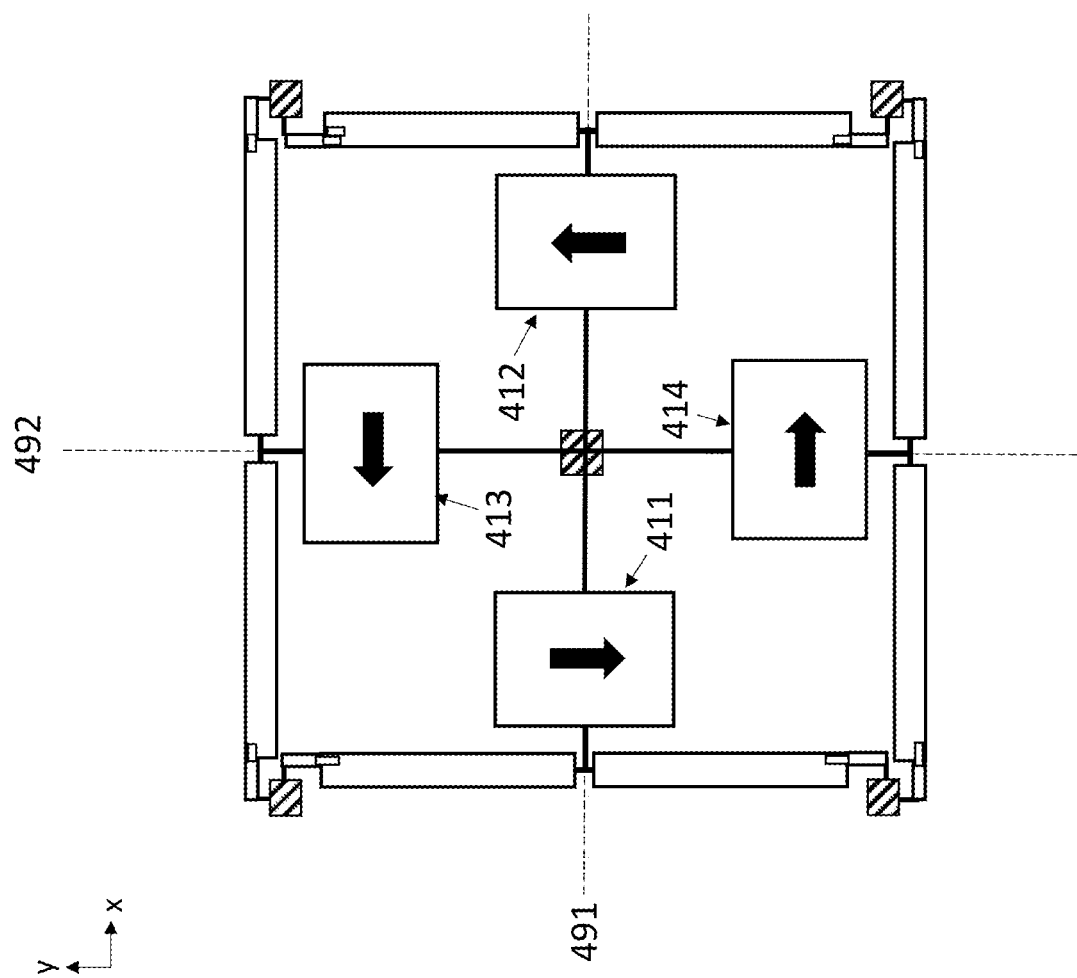

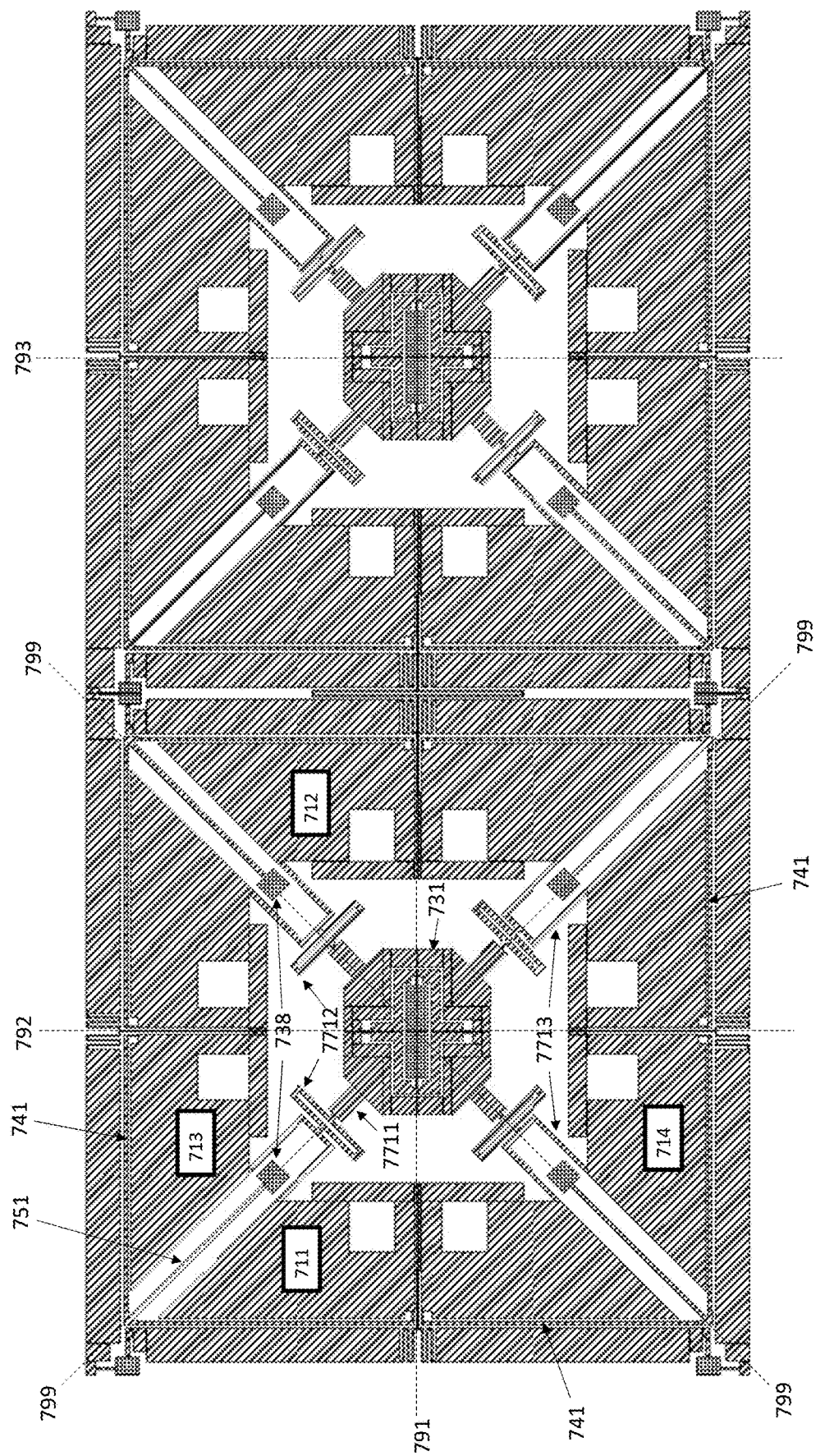

US 11,561,097 B2

MULTIAXIS GYROSCOPE WITH SUPPLEMENTARY MASSES

FIELD OF THE DISCLOSURE

This disclosure relates to microelectromechanical gyroscopes, and more particularly to gyroscopes where an oscillating mass system is used to measure angular rotation about multiple rotation axes.

BACKGROUND OF THE DISCLOSURE

In microelectromechanical (MEMS) gyroscopes, proof masses should preferably be easily set to oscillate in a primary oscillation mode (which may also be called the drive oscillation mode) and also easily undergo oscillation in a secondary oscillation mode (which may also be called the sense oscillation mode) induced by the Coriolis force. A general problem in gyroscope design is that the oscillation of the proof masses in these two modes should preferably not be perturbed by external disturbances, for example vibrations in surrounding elements. A gyroscope should preferably be unperturbed by both linear and rotational vibrations so that its output signal is determined only by the angular rotation rate which the gyroscope undergoes in the intended frequency range. In automotive applications, for example, potential disturbances typically lie in the frequency range 0-50 kHz, while the input frequency range typically lies below 1 kHz.

A simple MEMS gyroscope may be constructed utilizing only one oscillating proof mass, but the output signal of such a gyroscope will typically be very noisy when external vibrations are present at frequencies close to the operating frequency. One-mass gyroscopes would be practical only at operating frequencies above 50 kHz, but in these frequencies the sensitivity of the gyroscope may be very low and other disturbing effects, such as quadrature signals arising from manufacturing imperfections, often become very prominent. Also, the unbalanced drive mode of the single mass drive causes energy leakage from the drive mode due to reaction forces of the drive oscillation. This will induce all kinds of issues; increase drive force needed for operation, stability issues and requirement for hard die attachment etc.

It is known that a proof mass system where two or four proof masses oscillate in anti-phase can be made much more robust against vibrations than a one-mass gyroscope. Signal components arising from vibrations that induce cophasal movement of the two or four proof masses can to some degree be automatically cancelled via differential measurements. Furthermore, if the cophasal resonant frequency can be brought above 50 kHz without affecting the differential resonant frequency, the disturbing vibrations will typically produce no resonance amplification.

Some MEMS gyroscopes are designed for measuring the angular rotation rate about one axis which is perpendicular to the device substrate. Such gyroscopes may be called z-axis gyroscopes. Other MEMS gyroscopes are designed for measuring the angular rotation rate about either of the two perpendicular axes that lie within the substrate plane. Such gyroscopes may be called x-axis gyroscopes and/or y-axis gyroscopes. Gyroscopes designed for measuring angular rotation rate about the x-, y-, and z-axis with the same set of oscillating proof masses may be called multiaxis gyroscopes. It is challenging to design multiaxis gyroscopes that are robust against external vibrations because the mass system needs multiple degrees of freedom in order to respond to rotation about any of the three perpendicular axes.

BRIEF DESCRIPTION OF THE DISCLOSURE

An object of the present disclosure is to provide a robust multiaxis gyroscope. The object of the disclosure is achieved by an arrangement which is characterized by what is stated in the independent claim. The preferred embodiments of the disclosure are disclosed in the dependent claims.

The disclosure is based on the idea of using a mass system where a quartet of Coriolis masses is placed around a center point, and each Coriolis mass is coupled to two supplementary masses, here called elongated mass elements and elongated synchronization bars, close to the periphery of the Coriolis mass quartet. An advantage of this arrangement is that even though each Coriolis mass will oscillate in two secondary oscillation modes, each supplementary mass oscillates only in one secondary oscillation mode. This allows stronger detection signals to be sensed from each secondary oscillation mode. The arrangement also improves vibration robustness because the Coriolis masses can be resiliently suspended for the desired operational oscillation modes.

BRIEF DESCRIPTION OF THE DRAWINGS

In the following the disclosure will be described in greater detail by means of preferred embodiments with reference to the accompanying drawings, in which FIG. 1 illustrates the symbols which denote the primary and secondary oscillation modes in this disclosure.

FIGS. 3a-3f illustrate the oscillation modes of the first embodiment.

FIGS. 4a-4b illustrate gyroscopes with supplementary masses in a second embodiment.

FIGS. 4c-4g illustrate the oscillation modes of the second embodiment.

FIG. 7 illustrates a third example gyroscope.

DETAILED DESCRIPTION OF THE DISCLOSURE

First Embodiment

Figure 2A:
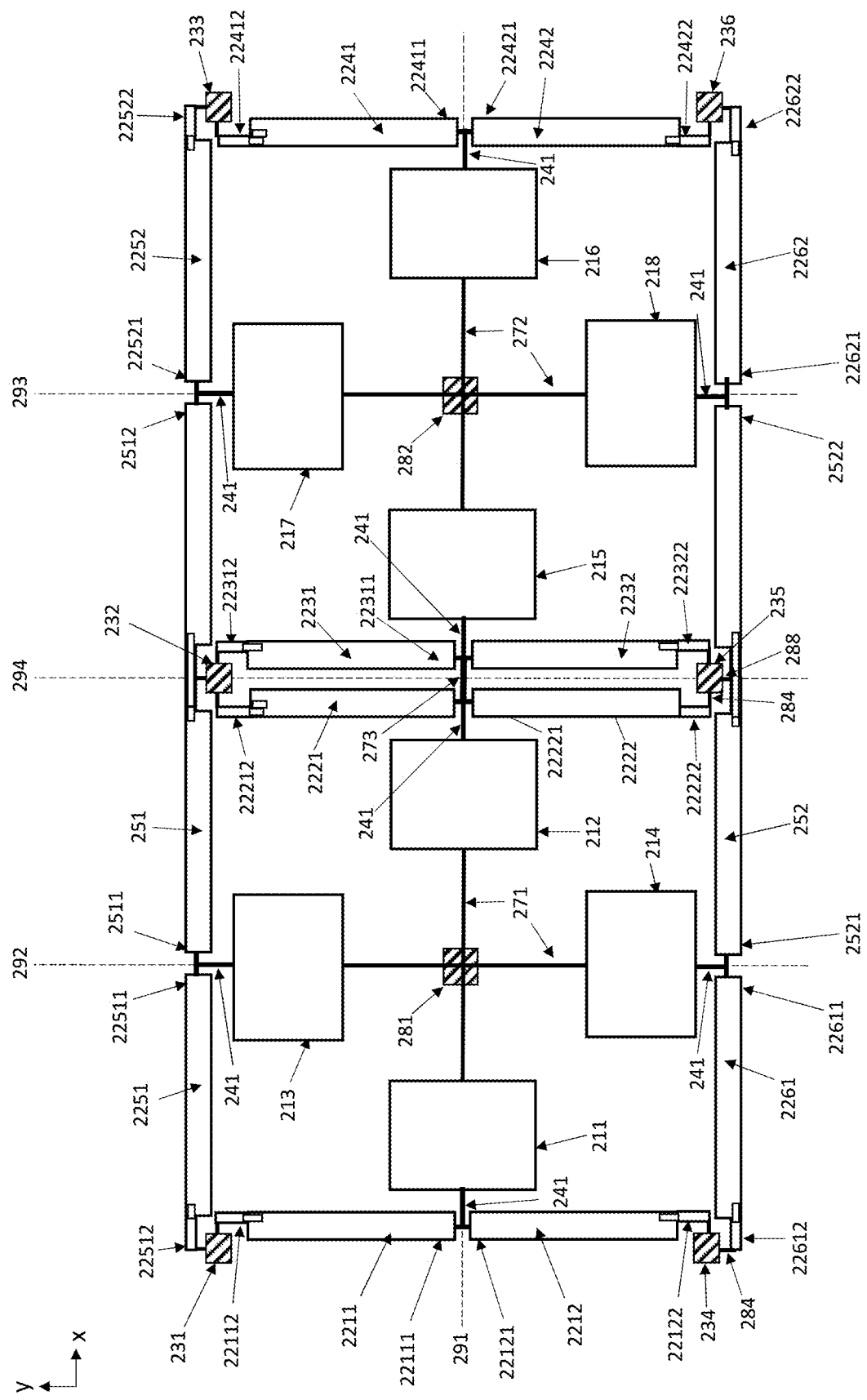
FIGS. 2a-2c illustrate gyroscopes with supplementary masses in a first embodiment.

FIG. 2a illustrates a microelectromechanical gyroscope which comprises a first Coriolis mass quartet which in its rest position lies in a device plane. The gyroscope also comprises a first quartet center point where a lateral axis 291 crosses a first transversal axis 292 orthogonally in the device plane. The gyroscope comprises a first central anchor point 281 located at the first quartet center point.

The first Coriolis mass quartet comprises a first (211), second (212), third (213) and fourth (214) Coriolis mass which are in their rest positions symmetrically arranged around the first quartet center point so that the first (211) and second (212) Coriolis masses are aligned on the lateral axis 291 and the third (213) and fourth (214) Coriolis masses are aligned on the first transversal axis 292.

The gyroscope also comprises a second Coriolis mass quartet which in its rest position lies in the device plane and a second quartet center point where the lateral axis 291 crosses a second transversal axis 293 orthogonally in the device plane. The gyroscope comprises a second central anchor point 282 located at the second quartet center point.

The second Coriolis mass quartet comprises a fifth (215), sixth (216), seventh (217) and eighth (218) Coriolis mass which are in their rest positions symmetrically arranged around the second quartet center point so that the fifth (215) and sixth (216) Coriolis masses are aligned on the lateral axis 291 and the seventh (217) and eighth (218) Coriolis masses are aligned on the second transversal axis 293. The gyroscope further comprises a third transversal axis 294 which crosses the lateral axis 291 substantially halfway between the first quartet center point and the second quartet center point.

The rest positions of the fifth (215), sixth (216), seventh (217) and eighth (218) Coriolis masses in relation to the second quartet center point are the same as the rest positions of the first (211), second (212), third (213) and fourth (214) Coriolis masses, respectively, in relation the first quartet center point, so that the third (213) and the seventh (217) Coriolis masses are located on a first side of the lateral axis 291, and the fourth (214) and the eighth (218) Coriolis masses are located on a second side of the lateral axis 291. The second (212) and fifth (215) Coriolis masses are adjacent to each other on opposing sides of the third transversal axis 294.

The gyroscope also comprises a first central suspension arrangement 271 for suspending the first Coriolis mass quartet 211–214 from the first central anchor point 281. The first central suspension arrangement 271 is centred around the first quartet center point inside the first Coriolis mass quartet 211–214. The gyroscope further comprises a second central suspension arrangement 272 for suspending the second Coriolis mass quartet 215–218 from the second central anchor point 282. The second central suspension arrangement 272 is centred around the second quartet center point inside the second Coriolis mass quartet 215–218.

The gyroscope further comprises a first (2211) and a second (2212) elongated mass element which are transversally aligned on opposing sides of the lateral axis 291 outside of the first Coriolis mass 211, and third (2221) and fourth (2222) elongated mass elements which are transversally aligned on opposing sides of the lateral axis 291 outside of the second Coriolis mass 212. The gyroscope also comprises fifth (2231) and sixth (2232) elongated mass elements which are transversally aligned on opposing sides of the lateral axis 291 outside of the fifth Coriolis mass 215 and seventh (2241) and eighth (2242) elongated mass elements which are transversally aligned on opposing sides of the lateral axis 291 outside of the sixth Coriolis mass 216. Said alignments occur when each elongated mass element is in its rest position.

Each of the first, second, third, fourth, fifth, sixth, seventh and eighth elongated mass elements 2211–2242 has a first end 22111–22421 which is closer to the lateral axis 291 and a second end 22112–22422 which is further away from the lateral axis 291. The first end 22111–22421 of each of these elongated mass elements is attached with a connecting element 241 to the corresponding Coriolis mass which lies adjacent on the inside of said elongated mass element.

The gyroscope further comprises a ninth (2251), tenth (2252), eleventh (2261) and twelfth (2262) elongated mass element, and the gyroscope also comprises first (251) and second (252) elongated synchronization bars which cross the third transversal axis 294. The first elongated synchronization bar 251 is laterally aligned with the ninth elongated mass element 2251 on opposing sides of the first transversal axis 292 outside of the third Coriolis mass 213. The first elongated synchronization bar 251 is laterally aligned with the tenth elongated mass element 2252 on opposing sides of the second transversal axis 293 outside of the seventh Coriolis mass 217. The second elongated synchronization bar 252 is laterally aligned with the eleventh elongated mass element 2261 on opposing sides of the first transversal axis 292 outside of the fourth Coriolis mass 214. The second elongated synchronization bar 252 is laterally aligned with the twelfth 2262 elongated mass element on opposing sides of the second transversal axis 293 outside of the eighth Coriolis mass 218. Said alignments occur when each elongated mass element and elongated synchronization bar is in its rest position.

The ninth (2251) and eleventh (2261) elongated mass elements have a first end (22511, 22611) which is closer to the first transversal axis 292 and a second end (22512, 22612) which is further away from the first transversal axis 292. The tenth (2252) and twelfth (2262) elongated mass elements have a first end (22521, 22621) which is closer to the second transversal axis 293 and a second end (22522, 22622) which is further away from the second transversal axis 293. The first end (22511, 22611, 22521, 22621) of each of these elongated mass elements is attached with a connecting element 241 to the corresponding Coriolis mass (213, 214, 217, 218) which lies adjacent on the inside of said elongated mass element.

The first and second elongated synchronization bars (251, 252) have a first end (2511, 2521) which is closer to the first transversal axis 292 and a second end (2512, 2522) which is closer to the second transversal axis (293), and each first and second end of each elongated synchronization bar (251, 252) is attached with a connecting element (241) to the corresponding Coriolis mass which lies adjacent on the inside of said first or second end.

The gyroscope further comprises a set of peripheral anchor points (231–236) outside of the first and second Coriolis mass quartets, and each elongated mass element (2211–2242, 2251–2252, 2261–2262) is suspended from a peripheral anchor point (231–236) by a mass element suspension arrangement which allows said elongated mass element to undergo rotational motion both in the device plane and out of the device plane substantially around its second end. Each elongated synchronization bar (251, 252) is suspended from a peripheral anchor point (232, 235) by a synchronization bar suspension arrangement which allows said elongated synchronization bar (251, 252) to undergo rotational motion both in the device plane and out of the device plane substantially around its midpoint.

The gyroscope further comprises one or more drive transducers (not illustrated in FIG. 2a) for setting the first and second Coriolis mass quartets, each of the said elongated mass elements and both of the said elongated synchronization bars into primary oscillating motion. The gyroscope also comprises one or more sense transducers (not illustrated in FIG. 2a) for detecting the secondary oscillating motion of the first and second Coriolis mass quartet, and/or the elongated mass elements, and/or the elongated synchronization bars, induced by the Coriolis force when the gyroscope undergoes angular rotation.

In all embodiments of this disclosure, each elongated mass element and elongated synchronization bar has a longer dimension and a shorter dimension in the device plane. The direction in which the longer dimension extends may be called the longitudinal direction of said elongated mass element. The expression "laterally aligned" means that the two elongated mass elements which form the pair of elongated mass elements are arranged end-to-end so that the longitudinal directions of both elongated mass elements substantially coincide and that these longitudinal directions are lateral. The expression "transversally aligned" refers to the same end-to-end alignment where the longitudinal directions of a pair are transversal. The same considerations apply to the alignment of elongated synchronization bars with elongated mass elements.

The expressions "aligned on the lateral/transversal axis", refer to the placement of Coriolis masses so that the said axes substantially cross the midpoint of said Coriolis mass. The Coriolis mass may be symmetric in relation to said axes and/or the axis may cross the center of gravity of said Coriolis mass.

The central suspension arrangements described in all embodiments of this disclosure provide structural support for the Coriolis masses and elongated mass elements described in this disclosure while flexibly accommodating their primary and secondary oscillating motion. The mass element suspension arrangements also provide structural support, especially for the elongated mass elements, and flexibly accommodate the primary and secondary oscillating motion. The connecting elements 241 couple the primary oscillating motion between the elongated mass elements and the corresponding Coriolis masses, and also flexibly accommodate the secondary oscillating motion in a manner which will be described in more detail below.

The signal-to-noise ratio by which the sense transducers can detect the induced Coriolis force depends on the amplitude of the secondary oscillation. The suspension and coupling arrangements described in the previous paragraph should preferably flexibly allow the Coriolis masses and elongated mass elements to oscillate in the desired primary and secondary oscillation modes while stiffly resisting the oscillation of these masses in undesired oscillation modes. Examples of desired oscillation modes will be given below.

In this disclosure the device plane is illustrated and referred to as the xy-plane. The x-direction is referred to as the lateral direction and the y-direction as the transversal direction. The device plane may also be called the horizontal plane. The z-axis is perpendicular to the xy-plane. It may also be called the vertical axis. Linear and/or rotational motion where the proof mass remains level in the device plane when it moves away from its rest position is referred to as "in-plane" motion or "motion in the device plane", while linear and/or rotational motion where the proof mass moves away from its rest position in a vertical direction is referred to as "out-of-plane" motion, or "motion out of the device plane".

In this disclosure, the words "horizontal" and "vertical" merely refer to the device plane and a direction perpendicular to the device plane, respectively. The device plane is typically defined by the substrate in which the micromechanical structures are prepared. The words "horizontal" and "vertical" do not imply anything about how the device should be oriented during manufacture or usage. The words "above" and "below" refer to differences in the vertical z-coordinate when describing the figures, and the words "up" and "down" refer to two opposite vertical directions.

Rotation about any axis perpendicular to the device plane will be referred to as rotation about the z-axis. Similarly, rotation about any axis parallel to the illustrated x-axis will be referred to as rotation about the x-axis, and rotation about any axis parallel to the illustrated y-axis will be referred to as rotation about the y-axis. The secondary oscillation modes which are induced by the Coriolis force in these three types of rotation will be referred to as z-axis secondary oscillation modes, x-axis secondary oscillation modes and y-axis secondary oscillation modes, respectively.

In this disclosure, the term "spring" refers to a device part which is flexible in at least one direction. The term "suspender" refers to a spring which is placed (possibly together with other device parts) between a fixed part (such as an anchor point) and a device part which oscillates when the device is operated. The terms "suspension structure" and "suspension arrangement" refer to a more complex combination of parts which together provide structural support to the mobile masses. Suspension structures and arrangements include at least one flexible suspender which provides the flexibility needed for accommodating the desired oscillation modes. They may include many suspenders and they may also include rigid parts. The suspenders typically bend or twist when the suspended mobile masses are in motion.

The rigid parts of a suspension structure/arrangement often move when the mobile masses are in motion (assuming that one or more flexible suspenders lie between said rigid parts and the corresponding anchor point). Some springs may form a synchronization structure, or they may be combined with rigid parts to form a synchronization structure. A synchronization structure may function also as a suspension structure. Alternatively, a synchronization structure may provide synchronization without providing structural support. More generally, springs which connect mass elements to each other and transmit oscillation from one mass element to another may also be called coupling springs or connecting springs. While transmitting movement is typically the primary function of coupling/connecting springs, they are also often designed to perform a synchronization function. The structures where such springs are included may be called coupling structures or connecting structures.

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support.

In general, all suspension, synchronization and coupling arrangements are optimized for support and for flexibility in certain directions and rigidity in other directions. These three variables may conflict with each other, so optimization means finding a good compromise solution. All elements of the gyroscope may influence these compromises.

In this disclosure, "radial" oscillation refers to linear movement in the xy-plane, away from a central point and towards a central point. "Tangential" oscillation refers to movement in the xy-plane, the xz-plane (lateral-vertical), or the yz-plane (transversal-vertical), along the tangent of an imaginary circle centred at a central point. Tangential oscillation in the xy-plane may be called in-plane tangential oscillation, while tangential oscillation in the xz- and yz-planes may be called out-of-plane tangential oscillation. Tangential oscillation may in practice be a mixture of linear movement and rotation. The suspension arrangement will typically determine how a Coriolis mass moves tangentially.

In the figures of this disclosure, the placement of the Coriolis masses corresponds to their rest positions unless otherwise stated. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which may occur (in the device plane) when the gyroscope undergoes rotation about the z-axis. The pair of symbols illustrated on row 13 will be used together to illustrate the out-of-plane movement of a pair proof masses when the gyroscope undergoes rotation about the x-axis. The pair of symbols illustrated on row 14 will be used together to illustrate the out-of-plane movement of a pair proof masses when the gyroscope undergoes rotation about the y-axis. On both rows 13 and 14, the cross illustrates motion away from the viewer and the dot illustrates movement towards the viewer.

In any embodiment presented in this disclosure, capacitive drive transducers may for example be implemented in an opening formed within one or more Coriolis masses. Capacitive sense transducers may be implemented either within an opening in one or more Coriolis masses or adjacent to one or more Coriolis masses to detect the z-axis secondary oscillation mode. Capacitive x-axis and y-axis sense transducers may be implemented above and/or below one or more Coriolis masses, and/or elongated mass elements and/or elongated synchronization bars to detect the x-axis and/or y-axis secondary oscillation modes, respectively.

In this disclosure, the expression "inside the Coriolis mass quartet" refers to a position which is closer to a quartet center point than the Coriolis mass quartet which surrounds said center point. Expressions such as "outside of the n:th Coriolis mass" refer to a position which is further away from the corresponding quartet center point than the n:th Coriolis mass and lies at least approximately on the same radius (extending outward from the corresponding quartet center point) as the n:th Coriolis mass. In this context, the quartet center point which corresponds to the n:th Coriolis mass is the quartet center point around which the Coriolis mass quartet with the n:th Coriolis mass has been placed. Similarly, expressions such as "the Coriolis mass which lies adjacent on the inside of an elongated mass element" refer to the Coriolis mass which is closest to the elongated mass element and lies at least approximately between said elongated mass element and the corresponding quartet center point.

In other words, the expressions "inside" and "outside" are used to refer to positions that are defined in relation to a given quartet center point. If the device comprises two quartet center points, then these expressions have two different references in that device and the intended meaning is clear from the context. The word "peripheral" is used in the same way, so that each peripheral anchor point is located outside of at least the Coriolis masses which surround an anchor point.

In FIG. 2a, the set of peripheral anchor points 231–236 comprises a first subset 231–233 which is aligned substantially laterally on the first side of the lateral axis 291 and a second subset 234–236 which is aligned substantially laterally on the second side of the lateral axis 291. The second end of each elongated mass element is in this case adjacent to the peripheral anchor point to which the element is attached, and the mass element suspension arrangement simply comprises a relatively short spring 284 which allows the elongated mass element to turn in the device plane by bending and out of the device plane by undergoing torsional twisting. Similarly, the synchronization bar suspension arrangement 288 is also a short spring which allows out-of-plane movement through torsional twisting of said spring and in-plane movement by bending of said spring.

Figure 2B:
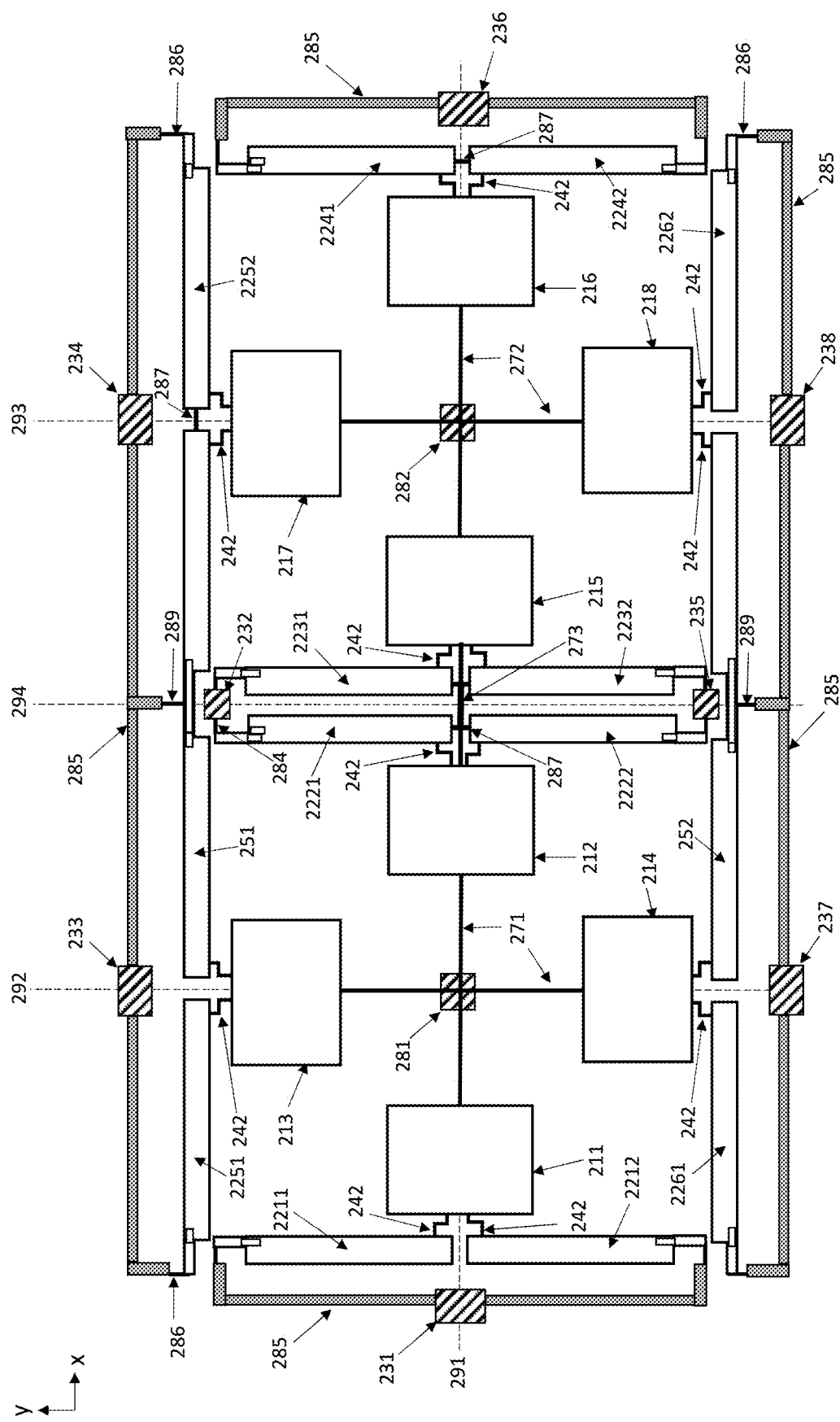

An alternative arrangement is illustrated in FIG. 2b. Here there are eight peripheral anchor points 231–238. Anchor points 231 and 236 lie on the lateral axis 291, 233 and 237 lie on the first transversal axis 292, while 234 and 238 lie on the second transversal axis 293 and 232 and 235 are placed in the same manner as in FIG. 2a. In this case the mass element suspension arrangement connected to anchor points 232 and 235 comprises a relatively short spring 284 as in FIG. 2a, but the mas element suspension arrangement which is connected to the other peripheral anchor points comprises one or more stiff bars 285 which extend from said peripheral anchor point towards the second end of the adjacent elongated mass elements and/or towards the middle of the adjacent elongated synchronization bars 251–252. A short and flexible spring 286 is in this case attached to the end of the one or more stiff bars 285 to provide the torsional and bending flexibility which facilitates the in-plane and out-of-plane turning of the elongated mass elements. Similarly, the in-plane and out-of-plane turning of the elongated synchronization bars about their midpoint is facilitated by torsion and bending in the springs 289 which here form the synchronization bar suspension arrangement together with stiff bars 285. The number and placement of the peripheral anchor points could also be something else than what the examples in FIGS. 2a-2b illustrate.

The connecting element which couples the first ends of two elongated mass elements to the adjacent Coriolis mass may be an element which joins these first ends together, as illustrated by connecting element 241 in FIG. 2a. Alternatively, the connecting element may be attached only between the first end of one elongated mass element and the adjacent Coriolis mass, as illustrated by connecting element 242 in FIG. 2b. It is optionally possible to add an additional synchronization spring 287 between the first ends of each pair of elongated mass elements, as illustrated for the pairs 2221+2222 and 2231+2232 and some others in FIG. 2b. An additional synchronization spring 273 which crosses the third transversal axis 294 may optionally be implemented between these additional synchronization springs. The springs 273 and 287 then synchronize the movement of these elongated mass elements in the primary oscillation mode and the y-axis secondary oscillation mode. FIG. 2a illustrates an additional synchronization spring which extends between the connecting elements 241 of the two pairs 2221+2222 and 2231+2232.

The lengths of the first, second, third, fourth, fifth, sixth, seventh and eighth elongated mass elements 2211–2242 in the transversal direction may all be substantially equal. The lengths of the ninth, tenth, eleventh and twelfth elongated mass elements 2251–2262 in the lateral direction may all be substantially equal to the length of the first elongated mass element 2211 in the transversal direction. The lengths of the first and second elongated synchronization bars 251–252 in the lateral direction may both be substantially twice as much as the length of the first elongated mass element 2211 in the transversal direction.

The third elongated mass element 2221 may be either attached to or incorporated with the fifth elongated mass element 2231 so that they together form a first unitary elongated mass element. The fourth elongated mass element 2222 may be either attached to or incorporated with the sixth elongated mass element 2232 so that they together form a second unitary elongated mass element.

Figure 2C:
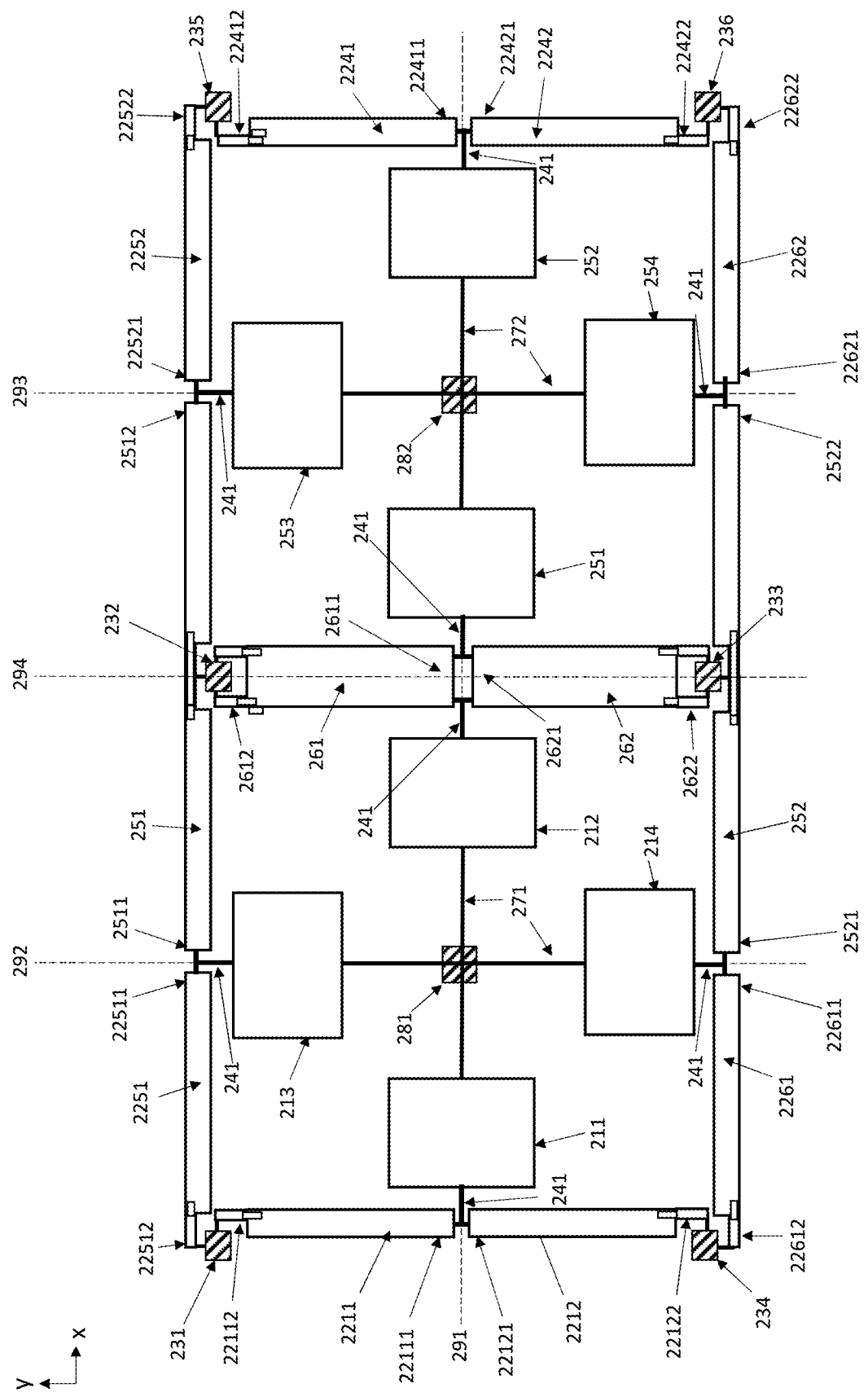

FIG. 2c illustrates a device where the elongated mass elements mentioned above have been incorporated with each other to form first and second unitary elongated mass elements 261 and 262, respectively. These two elements have first ends 2611 and 2621 and second ends 2612 and 2622 just as the elongated mass elements do, and the mass element suspension arrangements which suspend these unitary elongated mass elements from their respective peripheral anchor points facilitate rotation of the elements 261 and 262 around their second ends both in the device plane and out-of-the device plane. The oscillating motion of the unitary elongated mass elements 261 and 262 corresponds to the motion of the elongated mass elements 2221-2222 and 2231-2232 in both the primary oscillation mode and in the y-axis secondary oscillation mode.

Practical examples of these mass element suspenders, connecting spring arrangements and central suspension arrangements are given below.

Oscillation Modes in the First Embodiment

Figure 3A:
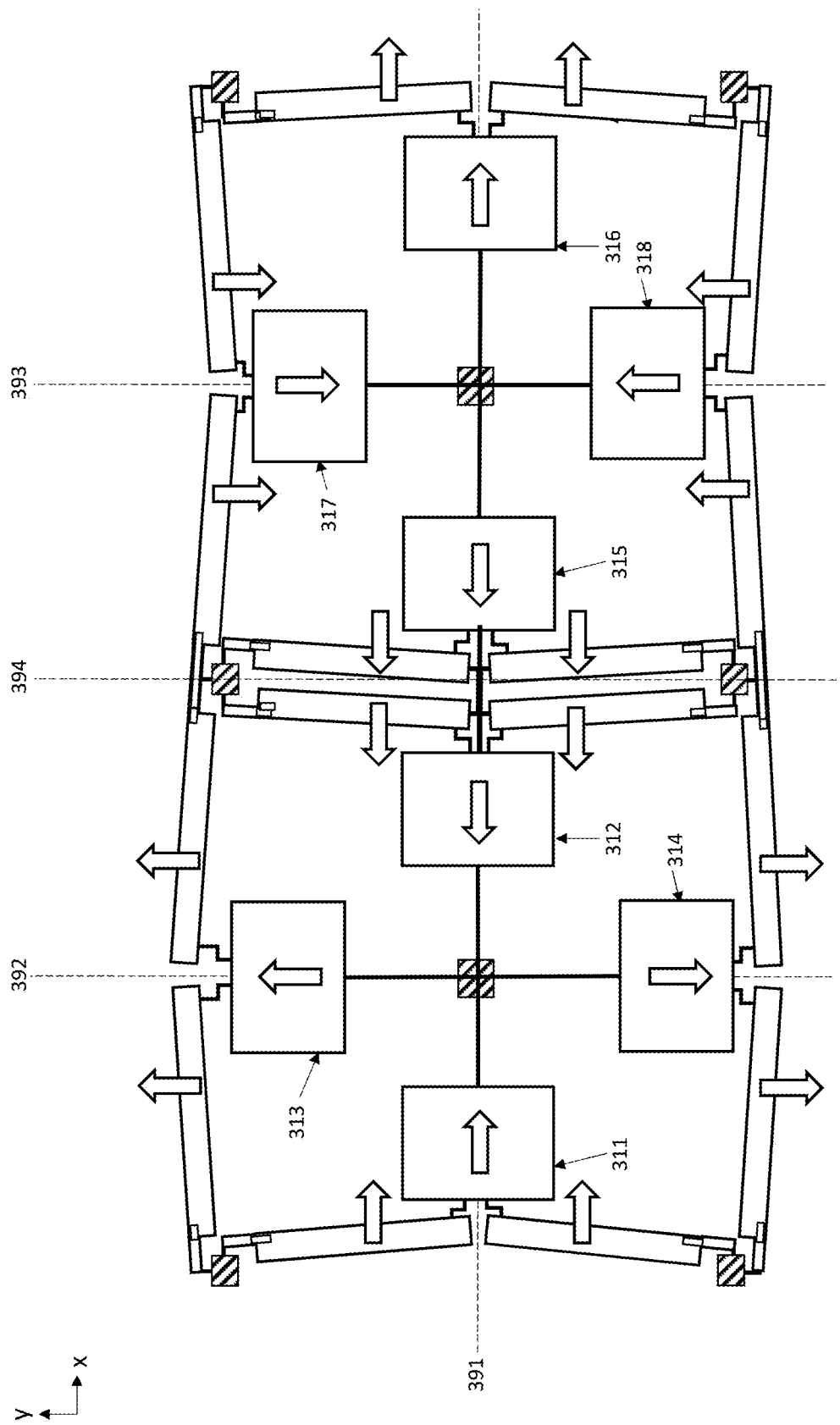

FIG. 3a illustrates a first primary oscillation mode for the device illustrated in FIG. 2a. Reference numbers 311-318 and 391-394 correspond to reference numbers 211-218 and 291-294, respectively, in FIG. 2a. In this disclosure, the illustrated parts may not be shown in their rest positions in figures which depict oscillation modes. In the first primary oscillation mode Coriolis masses 311-318 all oscillate linearly in a radial direction in relation to their corresponding quartet center points. In the illustrated half of the primary oscillation cycle, Coriolis masses 311, 312, 317 and 318 move in linear translation towards their corresponding quartet center points while Coriolis masses 313-316 move in linear translation away from their corresponding quartet center points. In the opposite half of the primary oscillation cycle (not illustrated), the motion of each Coriolis mass is reversed so that it moves in the opposite radial direction. The elongated mass elements which are coupled to each Coriolis mass undergo rotational in-plane movement around their second ends as shown in the figure, and the elongated synchronization bars undergo in-plane rotation about their midpoint. Again, in the opposite half of the primary oscillation cycle these movements are reversed. The elongated synchronization bars are stiff in the device plane, so their in-plane rotation synchronizes the movement of Coriolis mass pairs 313+317 and 314+318 effectively. If each central suspension arrangement also synchronizes the movement of each Coriolis mass quartet effectively (practical examples of such arrangements will be given below) then the primary oscillation movement of all Coriolis masses in the first and second quartets will be well-synchronized. The angle of rotation of the elongated mass elements and synchronization bars in primary oscillation has been exaggerated in FIG. 3a for illustrative purposes.

Coriolis masses 311-318 undergo secondary oscillation when the gyroscope rotates about the z-axis. The central suspension arrangement and connecting elements flexibly accommodate the first z-axis secondary oscillation mode which is induced by the Coriolis force if the primary oscillation mode is the first primary oscillation mode and the gyroscope undergoes angular rotation about the z-axis. The first z-axis secondary oscillation mode is illustrated in FIG. 3b.

In this secondary oscillation mode Coriolis masses 311-318 all move tangentially in relation to their respective quartet center points in the directions shown in the figure. In the opposite half of the oscillation cycle, each of these Coriolis masses moves in the opposite tangential direction. To detect z-axis rotation the gyroscope should comprise sense transducers for detecting the illustrated oscillation of Coriolis masses 311-318.

However, depending on how the central suspension arrangement and the peripheral couplings are constructed, the tangential oscillation of Coriolis masses 311-318 may be a mixture of translational and rotational movement. This may in some cases make it difficult to accurately detect z-axis secondary oscillation amplitudes from the movement of these masses. Additional (and optional) detection masses 351-358 may be added to the gyroscope to facilitate easier detection of the first z-axis secondary oscillation mode. The detection masses move diagonally in relation to the respective quartet center point in the first z-axis secondary oscillation mode.

Figure 3B:
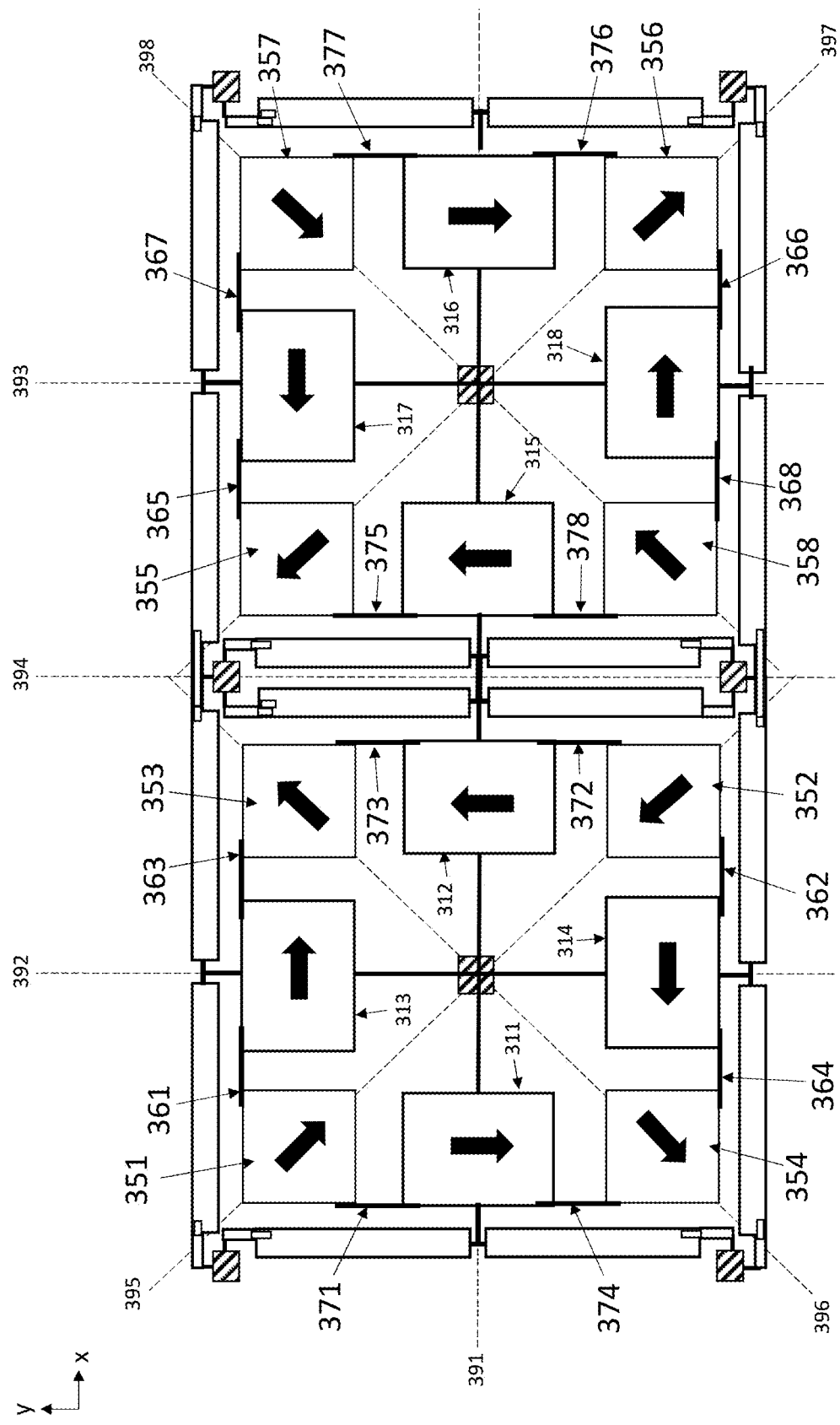

The gyroscope illustrated in FIG. 3b comprises first, second, third and fourth detection masses 351-354 which together form a first detection mass quartet which in its rest position is arranged symmetrically around the first quartet center point. The first and second detection masses 351 and 352 are aligned on a first diagonal axis 395 which crosses the lateral axis 391 and the first transversal axis 392 at an angle of 45 degrees and crosses the first quartet center point. The third and fourth detection masses 353 and 354 are aligned on a second diagonal axis 396 which is orthogonal to the first diagonal axis 395 and crosses the first quartet center point. The detection masses 355-358 are arranged around the second Coriolis mass quartet according to the same principle, aligned on the third and fourth diagonal axes 397-398.

A lateral corner spring 361-368 extends to each detection mass (351-358, respectively) from the laterally adjacent Coriolis mass. A transversal corner spring 371-378 extends to each detection mass (351-358, respectively) from the transversally adjacent Coriolis mass.

When the Coriolis masses 311-318 oscillate tangentially in the first z-axis secondary oscillation mode, this tangential oscillation is transmitted to the detection masses by the lateral and transversal corner springs. For example, the oscillation of proof masses 311 and 313 in opposite tangential directions pulls detection mass 351 toward the first quartet center point, while the oscillation of proof masses 312 and 313 in opposite directions pushes detection mass 353 away from the first quartet center point. The detection masses can be suspended with a suspension arrangement which allows radial movement, and since the momentum imparted by the corner springs in the lateral and transversal directions is equal (or very close to equal), the detection masses will then move in radial oscillation along the diagonal axes, in the manner illustrated in FIG. 3b.

The lateral corner springs are stiff in the lateral direction and flexible in the transversal direction, while the transversal corner springs are stiff in the transversal direction and flexible in the lateral direction. In other words, due to their dimensions, all corner springs have the radial flexibility needed for flexibly accommodating the first primary oscillation mode but are much stiffer in the tangential direction.

This means that the Coriolis mass quartets will not set the detection masses 351-358 in motion in the first primary oscillation mode. Instead, detection masses 351–358 will remain substantially stationary until the gyroscope undergoes rotation about the z-axis.

Each detection mass may be suspended from a diagonally placed anchor point (not illustrated) which lies on the diagonal axis on which said detection mass is aligned. The diagonal anchor point may, for example, be located within an opening formed in said detection mass. Capacitive sense transducers may be implemented either within openings in one or more detection masses, or adjacent to one or more detection masses, to detect their radial movement in the first z-axis secondary oscillation mode.

Figure 3C:
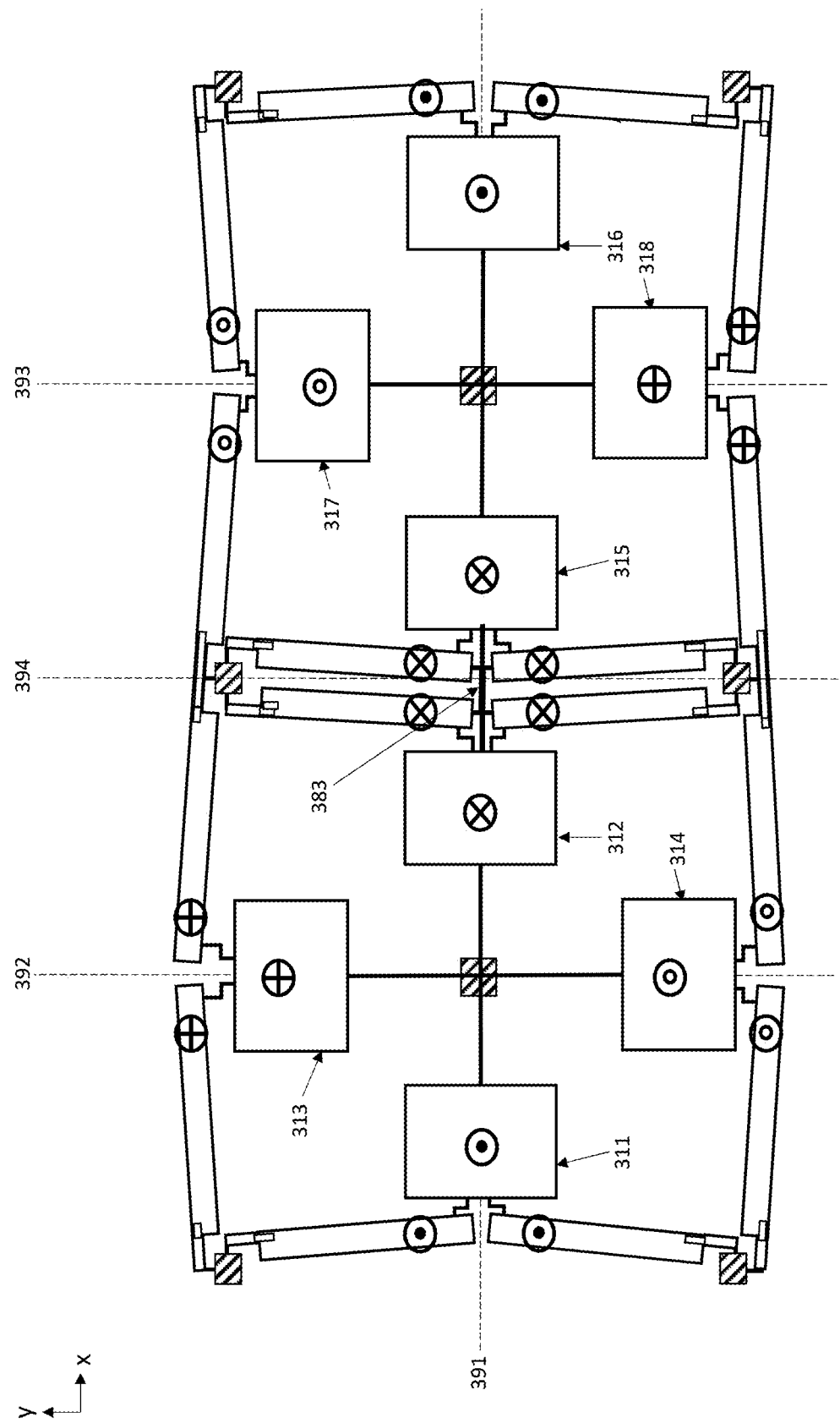

FIG. 3c illustrates a first x-axis secondary oscillation mode which is induced by the Coriolis force when the gyroscope is driven in the first primary oscillation mode and undergoes rotation about the x-axis and a first y-axis secondary oscillation mode which is induced by the Coriolis force when the gyroscope is driven in the first primary oscillation mode and undergoes rotation about the y-axis (these rotations do not necessarily occur at the same time even though they are here illustrated in the same figure). The Coriolis masses, elongated mass elements and elongated synchronization bars are here illustrated away from their rest positions in the xy-plane, in positions which they obtain when the first primary oscillation mode is used, but only the symbols of FIG. 1 illustrate the first x-axis and y-axis secondary oscillation modes which involve out-of-plane movement.

In the first y-axis secondary oscillation mode, Coriolis masses 312 and 315 and the first ends of the elongated mass elements coupled to them move in one out-of-plane direction, while Coriolis masses 311 and 316 and the first ends of the elongated mass elements coupled to them move in the opposite out-of plane direction. The elongated mass elements undergo out-of-plane rotation around their second ends.

In the first x-axis secondary oscillation mode, Coriolis masses 313 and 318 and the first ends of the elongated mass elements coupled to them move in one out-of-plane direction, while Coriolis masses 314 and 317 and the first ends of the elongated mass elements coupled to them move in the opposite out-of plane direction. The elongated mass elements undergo out-of-plane rotation around their second ends, while the two elongated synchronization bars rotate in opposite phase about the third transversal axis 394 in seesaw motion, which contributes to the synchronization of the x-axis secondary oscillation mode.

Each connecting element which attaches the first end of an elongated mass element to the adjacent Coriolis mass may be stiff in the vertical direction, so that their movement is strongly coupled. The optional additional synchronization spring, here illustrated with reference number 383, may be relatively stiff in the vertical direction so that the movement of Coriolis masses 312 and 315 and the adjacent elongated mass elements is also strongly coupled in the y-axis secondary oscillation mode. The additional synchronization spring should nevertheless allow Coriolis masses 312 and 315 (and the corresponding elongated mass elements) to turn in relation to each other because they typically tilt in opposite directions in the illustrated y-axis secondary oscillation mode. These considerations on connecting elements and the additional synchronization spring apply also in FIG. 3f below.

The central suspension arrangements of both Coriolis mass quartets accommodate and synchronize the x-axis and y-axis secondary oscillation modes within each quartet by turning flexibly about the lateral axis 391 and about the transversal axis (392 or 393) which crosses the corresponding quartet center point. This can be accomplished for example with a suspension arrangement which comprises a gimbal structure. Practical examples are given below.

The x-axis and y-axis secondary oscillation modes may be detected with one or more sense transducers which measure the out-of-plane movement the Coriolis masses, the elongated mass elements and/or the elongated synchronization bars. These sense transducers dedicated for measuring oscillation about the x-axis and y-axis can for example be constructed by using a Coriolis mass, elongated mass element or elongated synchronization bars as a first capacitive electrode and a vertically adjacent fixed electrode on the substrate or inner surface of the device package (or other enclosure) as the second capacitive electrode. These considerations on the sense transducers for measuring x-axis and y-axis rotation apply to all embodiments and examples presented in this disclosure.

Figure 3D:
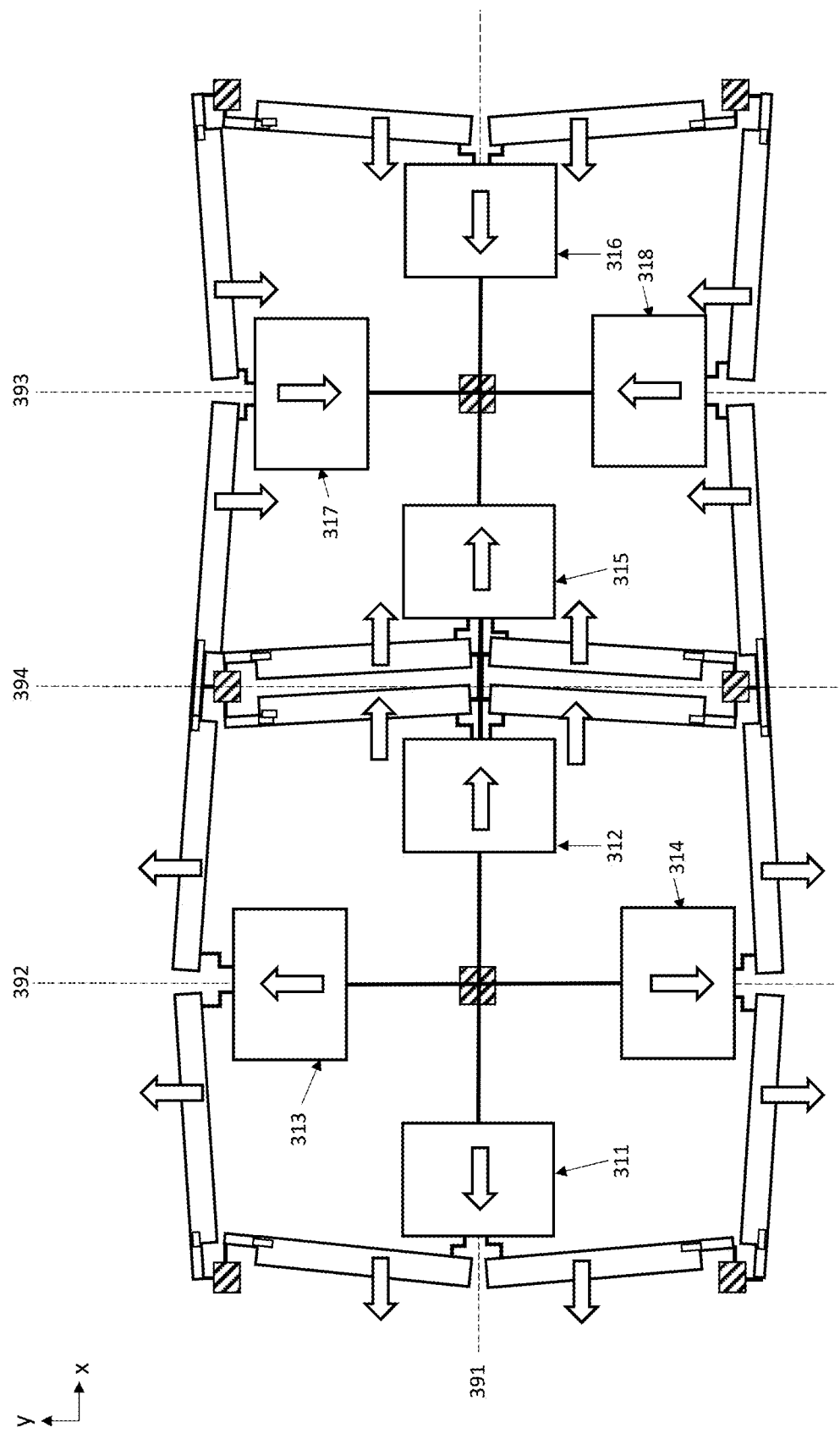

FIG. 3d illustrates a second primary oscillation mode, which is an alternative to the first. Either primary oscillation mode can be used, but a central suspension arrangement which accommodates and synchronizes the first primary oscillation can typically not accommodate and synchronize the second primary oscillation mode. Other parts of the gyroscope typically also have to be optimized based on the selected primary oscillation mode.

In the second primary oscillation mode Coriolis masses 311–318 also oscillate linearly in a radial direction in relation to the quartet center point. However, unlike in FIG. 3a, in the illustrated half of the primary oscillation cycle all masses in the first Coriolis mass quartet 311–314 move simultaneously in linear translation away from the first quartet center point, while all masses in the second Coriolis mass quartet move towards the second quartet center point. In the opposite half of the primary oscillation cycle (not illustrated), 311–314 move inward toward the first quartet center point and 315–318 outward from the second quartet center point. The elongated mass elements and elongated synchronization bars which are coupled to each Coriolis mass undergo the rotational movement determined by the movement of the Coriolis mass to which they are coupled, as FIG. 3d illustrates.

FIG. 3e illustrates a second z-axis secondary oscillation mode which is induced by the Coriolis force when the first and second Coriolis mass quartets are driven in the second primary oscillation mode and the gyroscope undergoes rotation about the z-axis. In this case the Coriolis masses 311–314 move tangentially in the clockwise direction in relation to the first quartet center point, while Coriolis masses 315–318 move counter-clockwise in relation to the second quartet center point. In the opposite half of the oscillation cycle, each of these Coriolis masses moves in the opposite tangential direction. Capacitive sense transducers may be implemented either within openings in the Coriolis masses 311–318, or adjacent to one or more of these Coriolis masses, to detect their movement in the second z-axis secondary oscillation mode. It would also be possible in FIG. 3e to utilize additional detection masses such as 351–358 in FIG. 3b and connect sense transducers to them.

The connecting elements (such as 241 and 242 in FIG. 2a) should preferably exhibit flexibility for the first and second z-axis secondary oscillation modes so that the secondary oscillation of the Coriolis masses 311–318 is not transmitted to the elongated mass elements which are coupled to these Coriolis masses. Practical examples of connecting elements will be presented below.

Figure 3F:
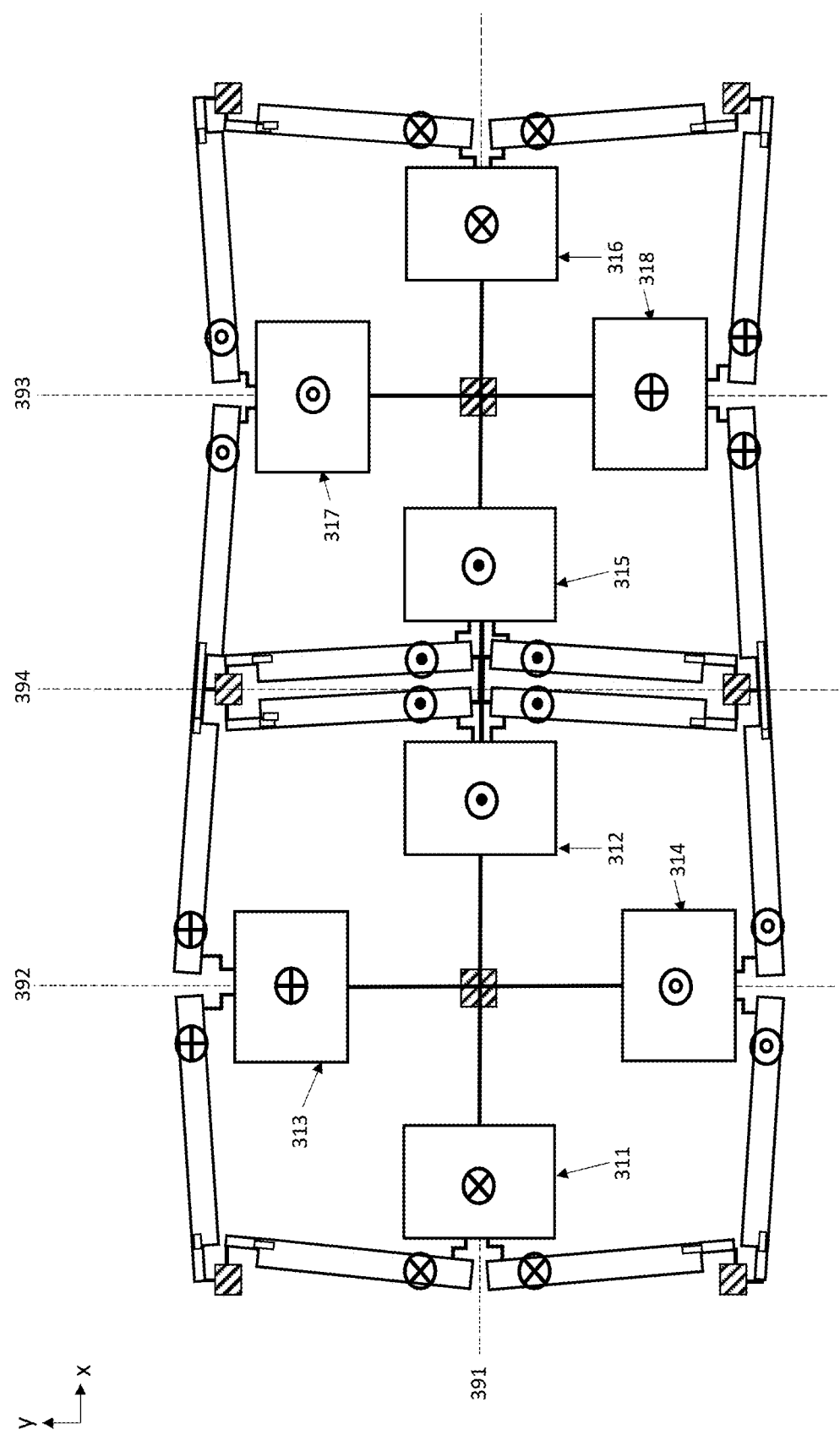

FIG. 3f illustrates second x-axis and y-axis secondary oscillation modes that are induced by the Coriolis force when the gyroscope is driven in the second primary oscillation mode and undergoes rotation about the x-axis and y-axis, respectively. The Coriolis masses, elongated mass elements and elongated synchronization bars are here again illustrated away from their rest positions in the xy-plane, in positions which they obtain when the second primary oscillation mode is used, but only the symbols of FIG. 1 illustrate the second x-axis and y-axis secondary oscillation modes which involve out-of-plane movement. It can be seen that the second x-axis and y-axis secondary oscillation modes are equal to the first x-axis and y-axis secondary oscillation modes, respectively. The discussion of the first x-axis and y-axis secondary oscillation modes given above with reference to FIG. 3c therefore applies to FIG. 3f also.

Second Embodiment

FIG. 4a illustrates a microelectromechanical gyroscope where the gyroscope comprises a Coriolis mass quartet which in its rest position lies in a device plane and a quartet center point where a lateral axis 491 crosses a transversal axis 492 orthogonally in the device plane. The gyroscope comprises a central anchor point 481 located at the quartet center point and the Coriolis mass quartet comprises four Coriolis masses 411–414 which are in their rest positions symmetrically arranged around the quartet center point. The first and second Coriolis masses (411, 412) in the Coriolis mass quartet are aligned on the lateral axis 491 in their rest position. The third and fourth Coriolis masses (413, 414) in the Coriolis mass quartet are aligned on the transversal axis 492 in their rest position.

The gyroscope further comprises a central suspension arrangement 475 for suspending the Coriolis mass quartet 411–414 from the central anchor point 481. The central suspension arrangement 475 is centred around the quartet center point inside the Coriolis mass quartet 411–414.

The gyroscope further comprises a first and a second elongated mass element (4211, 4212) which are transversally aligned on opposing sides of the lateral axis 491 outside of the first Coriolis mass 411, and third and fourth elongated mass elements (4221, 4222) which are transversally aligned on opposing sides of the lateral axis 491 outside of the second Coriolis mass 412. The gyroscope also comprises fifth and sixth elongated mass elements (4231, 4232) which are laterally aligned on opposing sides of the transversal axis 492 outside of the third Coriolis mass 413, and seventh and eighth elongated mass elements (4241, 4242) which are laterally aligned on opposing sides of the transversal axis 492 outside of the fourth Coriolis mass 414.

The fifth, sixth, seventh and eighth elongated mass elements discussed in this second embodiment should not be confused with the fifth, sixth, seventh and eighth elongated mass elements discussed in the first embodiment. No elongated synchronization bars are needed in this second embodiment because it defines only one Coriolis mass quartet, so all Coriolis mass are simply coupled to two adjacent elongated mass elements.

A first end 42111 of the first elongated mass element 4211 is adjacent to a first end 42121 of the second elongated mass element 4212, and a first end 42211 of the third elongated mass element 4221 is adjacent to a first end 42221 of the fourth elongated mass element 4222. A first end 42311 of the fifth elongated mass element 4231 is adjacent to a first end 42321 of the sixth elongated mass element 4232, and a first end 42411 of the seventh elongated mass element 4241 is adjacent to a first end 42421 of the eighth elongated mass element 4242. Each of the said elongated mass elements has a second end (42112, 42122, 42212, 42222, 42312, 42322, 42412, 42422) which is opposite to the first. The first end (42111, 42121, 42211, 42221, 42311, 42321, 42411, 42421) of each of these elongated mass elements is attached with a connecting element 441 to the corresponding Coriolis mass 411–414 which lies adjacent on the inside of said elongated mass element.

The gyroscope further comprises a set of peripheral anchor points 431–434 outside of the Coriolis mass quartet. Each elongated mass element (4211, 4212, 4221, 4222, 4231, 4232, 4241, 4242) is suspended from a peripheral anchor point (431–434) by a mass element suspension arrangement 484 which allows said elongated mass element to undergo rotational motion both in the device plane and out of the device plane substantially around its second end.

The gyroscope further comprises one or more drive transducers (not illustrated in FIG. 4a) for setting the Coriolis mass quartet 411–414 and each of the said elongated mass elements (4211, 4212, 4221, 4222, 4231, 4232, 4241, 4242) into primary oscillating motion, and one or more sense transducers (not illustrated in FIG. 4a) for detecting the secondary oscillating motion of the first Coriolis mass quartet and/or the elongated mass elements, induced by the Coriolis force when the gyroscope undergoes angular rotation.

In FIG. 4a the set of peripheral anchor points 431–434 comprises a first subset 431–432 which is aligned substantially laterally on the first side of the lateral axis 491 and a second subset 433–434 which is aligned substantially laterally on the second side of the lateral axis 491. The second end of each elongated mass element is in this case adjacent to the peripheral anchor point to which the element is attached, and the mass element suspension arrangement comprises a relatively short spring 484 which allows the elongated mass element to turn in the device plane and out of the device plane. Other mass element suspension arrangements are also possible. The alternative arrangement of peripheral anchor points which was illustrated in FIG. 2b could also be used in this case. Similarly, the connecting element 441 shown in FIG. 4a is the same as the element 242 shown in FIG. 2b, which is attached only between the first end of one elongated mass element and the adjacent Coriolis mass. FIG. 4b illustrates an alternative connecting element 442, which joins the first ends of adjacent elongated mass elements together and couples them both to the adjacent Coriolis mass.

Optionally, it is possible to add an additional synchronization spring between the first ends of each pair of elongated mass elements in FIG. 4a, such as 287 in FIG. 2b. Practical examples of mass element suspenders, connecting spring arrangements and central suspension arrangements are given below.

The lengths of the first, second, third and fourth elongated mass elements in the transversal direction may all be substantially equal, and the lengths of the fifth, sixth, seventh and eighth elongated mass elements in the lateral direction may all be substantially equal to the length of the first elongated mass element in the transversal direction.

In both the first and second embodiment, the elongated mass elements described above may alternatively be called mass bars, elongated mass bars or elongated bars.

Oscillation Modes in the Second Embodiment

The primary and secondary oscillation modes that can be used in this second embodiment are directly analogous to the primary and secondary oscillation modes presented for the first embodiment above. As in the first embodiment, the first ends of the two elongated mass elements which are coupled to a given Coriolis mass move together with that Coriolis mass both in the device plane and out of the device plane in all primary and secondary oscillation modes in this second embodiment.

Figure 4D:
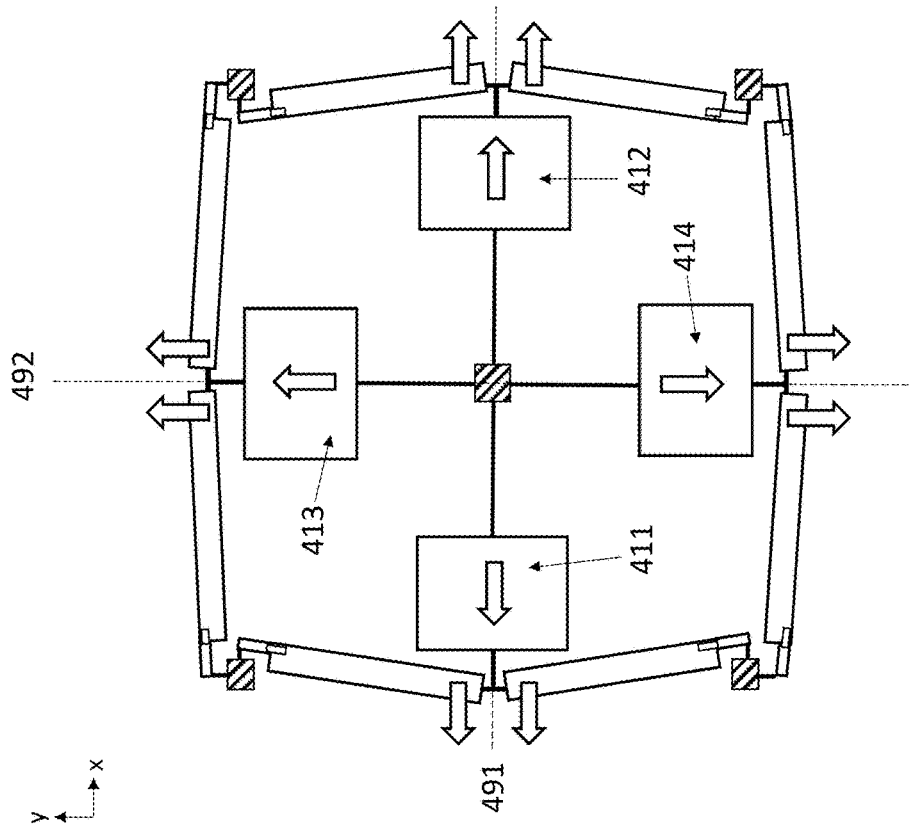
Figure 4C:
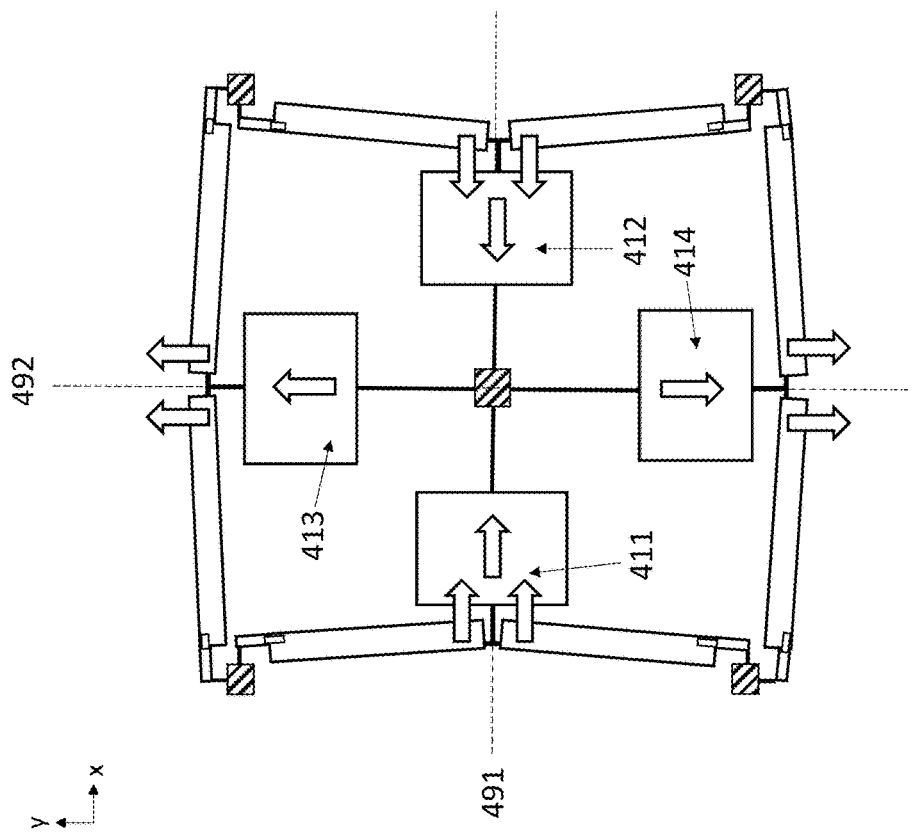

FIG. 4c illustrates a first primary oscillation mode where all Coriolis masses 411–414 move in linear translation radially in relation to the quartet center point. Masses 411–412 move towards the quartet center point when masses 413–414 move away from it, and vice versa. FIG. 4d illustrates a second primary oscillation mode where all four Coriolis masses in the quartet 411–414 move simultaneously away from the quartet center point, and then in the opposite half of the oscillation cycle simultaneously toward the quartet center point.

Figure 4F:
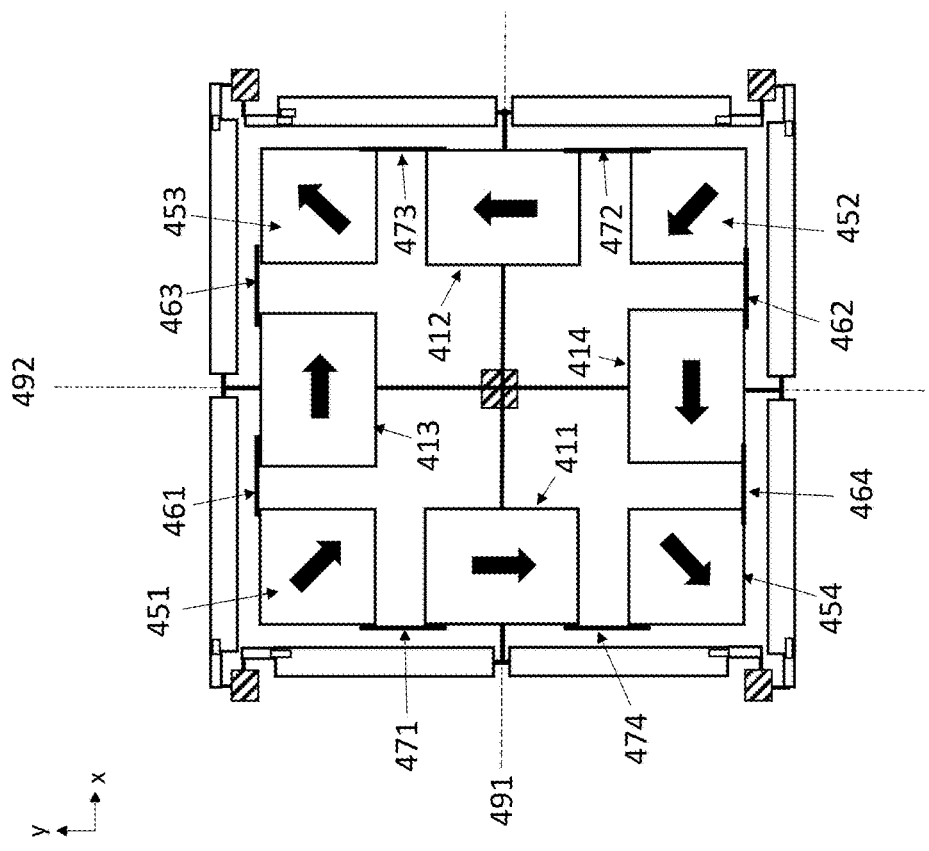
Figure 4E:
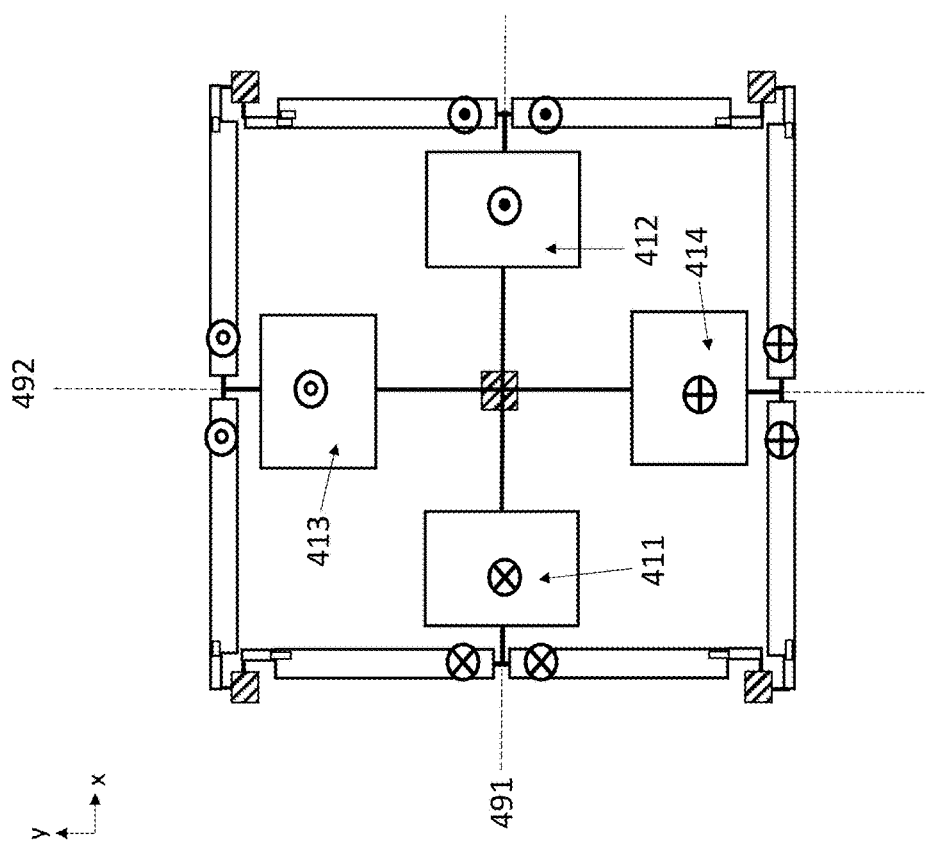

FIG. 4e illustrates the x-axis secondary oscillation mode which is obtained when the gyroscope is driven either in the first or the second primary oscillation mode and the gyroscope undergoes rotation about the x-axis and the y-axis secondary oscillation mode which is obtained when the gyroscope is driven either in the first or the second primary oscillation mode and the gyroscope undergoes rotation about the y-axis. These rotations do not necessarily occur at the same time even though they are here illustrated in the same figure.

The Coriolis masses and elongated mass elements are in FIG. 4e illustrated in their rest positions in the xy-plane, but they could equally well be illustrated in any other in-plane position that they obtain in the first or second primary oscillation modes, as FIGS. 3c and 3f exemplified above. In response to rotation about the x-axis, Coriolis masses 413–414 move out of the device plane in opposite directions. In response to rotation about the y-axis, Coriolis masses 411–412 move out of the device plane in opposite directions.

The central suspension arrangement of the Coriolis mass quartet accommodates and synchronizes the x-axis and y-axis secondary oscillation modes by turning flexibly about the lateral axis 491 and about the transversal axis 492. This can be accomplished for example with a suspension arrangement which comprises a gimbal structure. Practical examples are given below.

FIG. 4f illustrates a first z-axis secondary oscillation mode which is obtained when the gyroscope is driven in the first primary oscillation mode and the gyroscope undergoes rotation about the z-axis. Coriolis masses 411–414 move tangentially in the same manner as Coriolis masses 311–314 in FIG. 3b. Detection masses 451–454 and corner springs 461–464 and 471–474 also correspond to detection masses 351–354 and corner springs 361–364 and 371–374, respectively, in FIG. 3b, and perform the technical functions that were described with reference to that figure.

FIG. 4g illustrates a second z-axis secondary oscillation mode which is obtained when the gyroscope is driven in the second primary oscillation mode and the gyroscope undergoes rotation about the z-axis. Capacitive sense transducers may be implemented either within openings in the Coriolis masses 411–414, or adjacent to one or more of these Coriolis masses, to detect their movement in the second z-axis secondary oscillation mode. It would again also be possible in figure to utilize additional detection masses such as 351–354 in FIG. 3b and connect sense transducers to them.

Practical Examples

Figure 5A:
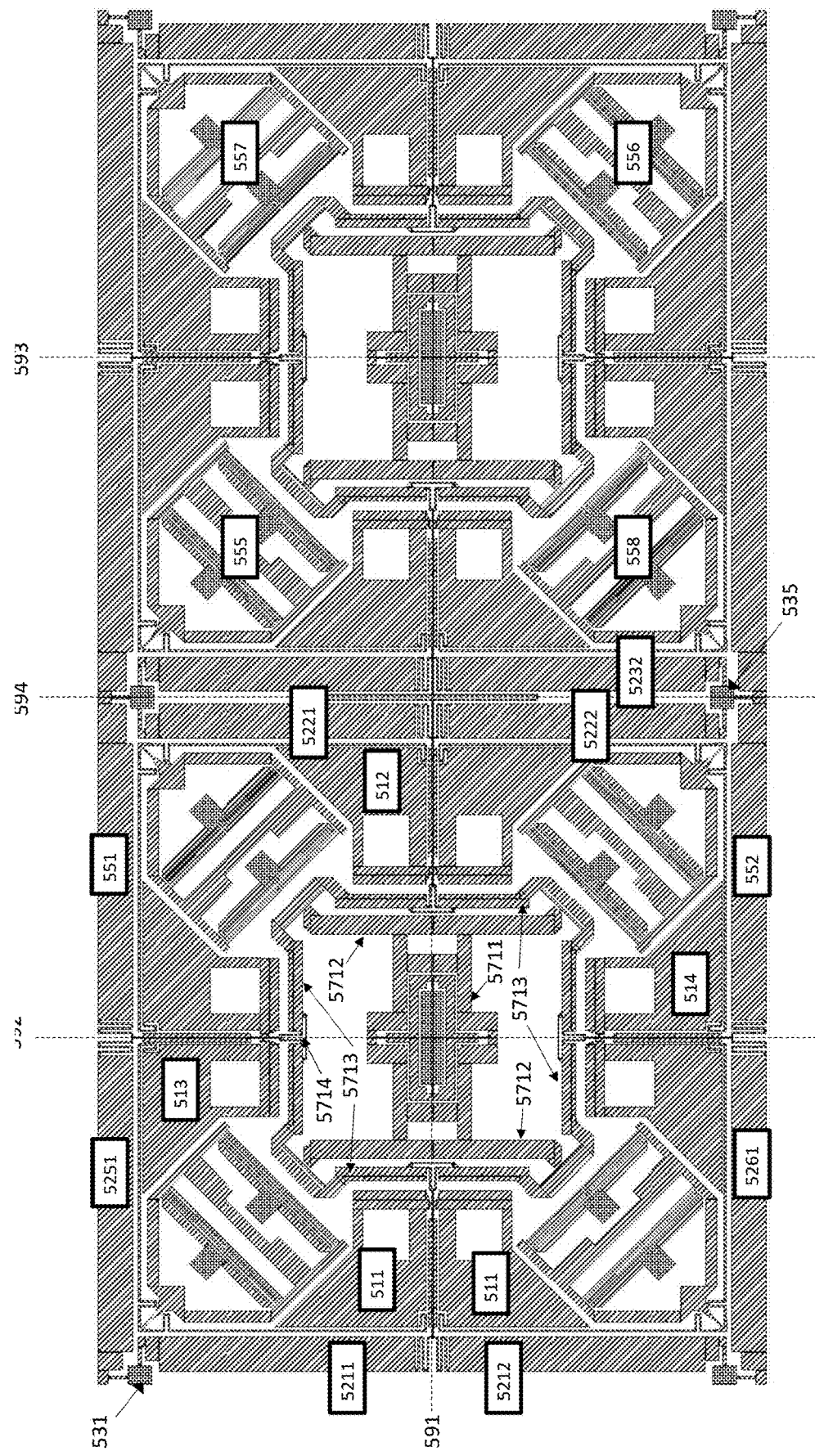
FIGS. 5a-5c illustrate a first example gyroscope.

FIG. 5a illustrates a first example gyroscope which corresponds to the first embodiment. Reference numbers 511–514, 5211–5212, 5221–5222, 5231–5232, 5251, 5261, 531, 535, 551–552, 573 and 591–594 corresponds to reference numbers 211–214, 2211–2212, 2221–2222, 2231–2232, 2251, 2261, 231, 235, 251–252, 273 and 291–294, respectively, in FIGS. 2a and 2b. Reference numbers 555–558 correspond to reference numbers 355–358, respectively, in FIG. 3b. Coriolis masses, elongated mass elements, elongated synchronization bars, detection masses for detecting the z-axis mode and central suspension arrangements have here been implemented with the same layout and symmetry around both the first and second quartet center points.

The gyroscope illustrated in FIG. 5a can be driven in the first primary oscillation mode shown in FIG. 3a. Each central suspension arrangement comprises a central gimbal structure 5711 where two concentric gimbal frames are suspended from the central anchor point by a pair of lateral torsion bars and a pair of transversal torsion bars which together facilitate rotation about both the lateral axis and the transversal axis.

The central suspension arrangements also comprise two rigid continuation bars 5712 which extend substantially in two opposite transversal directions from the two lateral ends of the central gimbal structure 5711. The central suspension arrangement also comprises a central synchronization structure which accommodates and synchronizes the movement of the Coriolis masses in the first primary oscillation mode.

The central synchronization structure comprises four corner elements 5713 which are attached to the ends of said rigid continuation bars 5712. The attachment point of each corner element may lie substantially on the corresponding diagonal axis. The corner elements 5713 may together form an approximately square shape around the corresponding gyroscope center point in their rest position. The adjacent ends of each corner element 5713 are joined together by end-connecting spring 5714 which allow the corner elements 5713 to rotate in relation to each other in the device plane. The bars 5712, corner elements 5713 and end-connecting springs 5714 may be rigid in movement out of the device plane so that the out-of-plane movement of the Coriolis masses in the x-axis and y-axis secondary oscillation modes can be effectively synchronized via the central gimbal structure 5711.

Figure 5B:
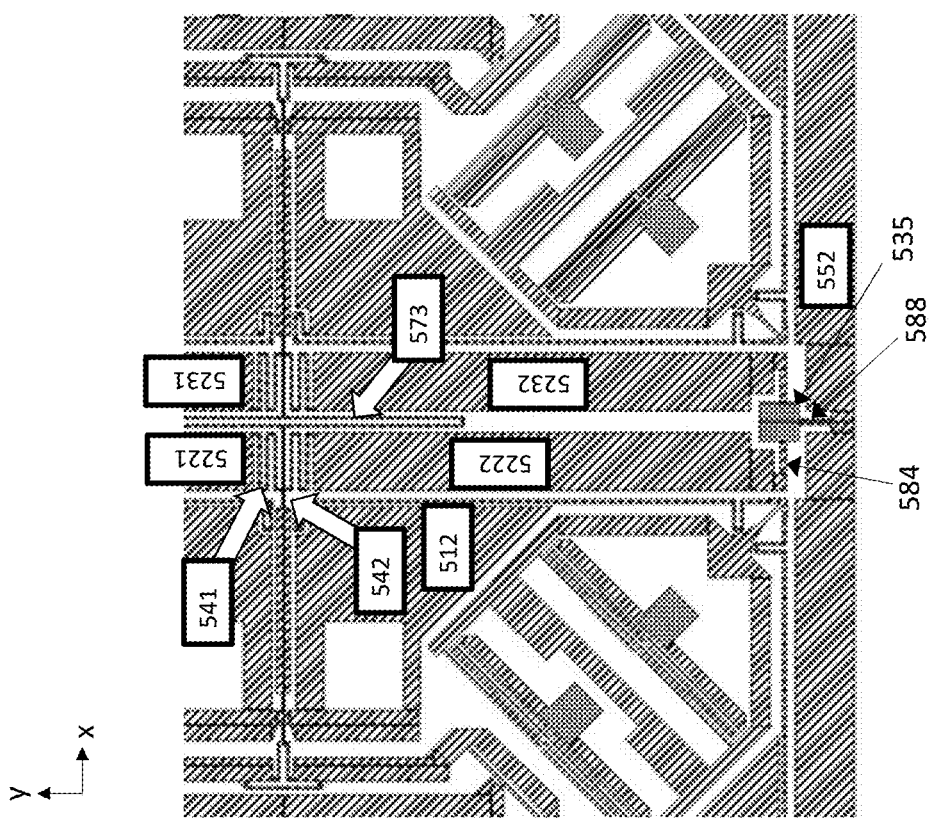

FIG. 5b illustrates the mass element suspension arrangements and the synchronization bar suspension arrangements in more detail around anchor point 535. Reference numbers 584 and 588 here correspond to reference numbers 284 and 288, respectively, in FIG. 2a. The springs 584 and 588 have been dimensioned so that they undergo a suitable degree of in-plane bending in the first primary oscillation mode and a suitable degree of torsional twisting in the x-axis and y-axis secondary oscillation modes, while still providing structural support.

The connecting element which joins elongated mass elements 5221 and 5222 to each other consists of a meandering spring 541 which extends between the first ends of these two corresponding elongated mass elements (in the y-direction in FIG. 5b) and a straight spring 542 which extends orthogonally to the meandering spring (in the x-direction in FIG. 5b) and from the meandering spring 541 to the corresponding Coriolis mass 512. In both the first and second primary oscillation mode, the straight spring 542 is pushed and pulled back and forth in the lateral direction by the movement of the Coriolis mass 512. The meandering spring 541 transfers this movement to the elongated mass elements 5221 and 5222, and they thereby oscillate with the Coriolis mass. The meandering spring 541 also synchronizes the movement of the two elongated mass elements 5221 and 5222 in the y-axis secondary oscillation mode. The meandering spring 541 has enough torsional flexibility to allow the elongated mass elements 5221 and 5222 to turn in relation to each other as they rotate out of the device plane. All other connecting elements shown in FIG. 5a also have the same structure and function. An optional additional synchronization spring 573 which synchronizes the y-axis secondary oscillation mode also joins the two meandering springs to each other, thereby connecting the pair 5221+5222 to the pair 5231+5232 and the first Coriolis mass quartet to the second Coriolis mass quartet.

Figure 5C:
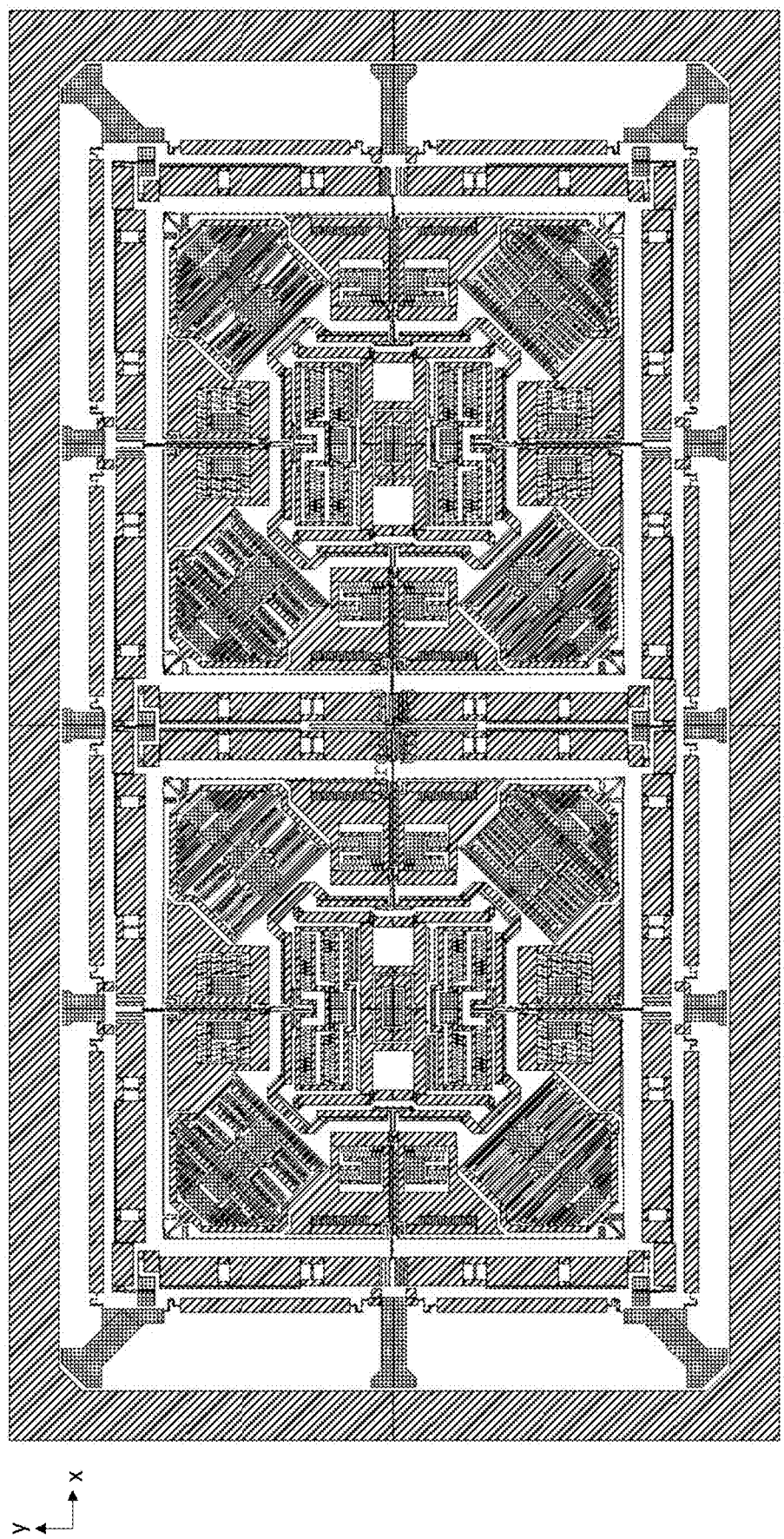

FIG. 5c illustrates how capacitive transducers may be implemented in the openings of the Coriolis masses, detection masses and the central suspension structure. These transducers may be used for generating the primary oscillation, detecting the secondary or the primary oscillation, or for other purposes. Transducers can be implemented in a similar manner in any practical example device presented in this disclosure.

More generally, in any embodiment where the first primary oscillation mode shown in FIG. 3a or FIG. 4c is used, the central suspension structure may comprise, around each quartet center point, a suspension arrangement which comprises a symmetrical closed pattern in the device plane which is anchored to the corresponding central anchor point and coupled to each mass in the corresponding Coriolis mass quartet so that the symmetrical closed pattern will easily contract on the lateral axis with a matching forced expansion on the corresponding transversal axis, and vice versa.

Figure 6:
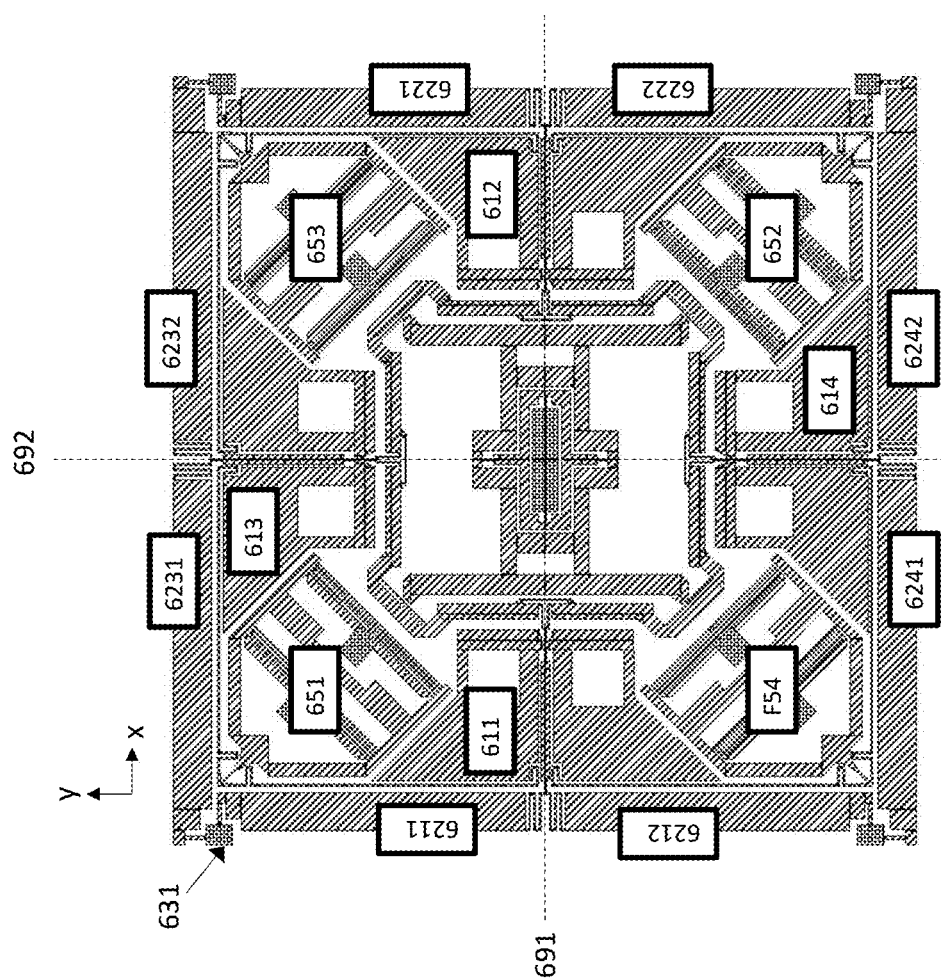
FIG. 6 illustrates a second example gyroscope.

FIG. 6 illustrates a second example gyroscope which corresponds to the second embodiment. Reference numbers 611–614, 6211–6242 and 651–654 correspond to reference numbers 411–414, 4211–4242 and 451–454, respectively, in FIGS. 4a-4c and 4e-4f.

The gyroscope illustrated in FIG. 6 can be driven in the first primary oscillation mode shown in FIG. 4c. The central suspension arrangement in FIG. 6 is identical to the central suspension arrangements shown in FIG. 5a, so the descriptions and options discussed that were discussed with reference to that figure apply to the central suspension arrangement in FIG. 6 as well.

The mass element suspension arrangements and connecting elements in FIG. 6 are also identical to the mass element suspension arrangements and connecting elements of FIG. 5a, so the descriptions and options that were presented with reference to that figure apply to the mass element suspension arrangements and connecting elements in FIG. 6 as well.

FIG. 7 illustrates a third example gyroscope which corresponds to the first embodiment. Reference numbers 711–714 and 791–792 correspond to reference numbers 711–714 and 391–392 in FIGS. 3d-3f. The gyroscope illustrated in FIG. 7 can be driven in the second primary oscillation mode shown in FIG. 3d. Each central suspension arrangement comprises a central gimbal structure 731 where two concentric gimbal frames are suspended from the central anchor point by a pair of lateral torsion bars and a pair of transversal torsion bars which together facilitate rotation about both the lateral axis 791 and the first or second transversal axis 792 and 793.

Taking the first quartet as an example, each central suspension structure comprises four rigid supports 7711 which extend outward from the central gimbal structure 731 in the diagonal directions, i.e. the directions defined by diagonal axes 799 in FIG. 7. Each rigid support is connected to a radially flexible but tangentially stiff first synchronization spring 7712, which may be a box spring, and which flexibly accommodates the simultaneous outward and inward movement of Coriolis masses 711–714 in the primary oscillation mode. Two tangentially flexible but radially stiff second synchronization springs 7713 extend from each first synchronization spring 7712 to each of the adjacent Coriolis masses. The second synchronization springs flexibly accommodate the simultaneous tangential movement of Coriolis masses 711–714 in the second z-axis secondary oscillation mode.

The Coriolis masses 711–714 supported by an additional intermediate suspension structure. Four diagonal anchor points 738 are placed symmetrically in relation to the first center point on the diagonal axes 799. Radial suspenders 751 extend outward from each of these diagonal anchor points 738. These radial suspenders are joined to peripheral suspenders 741 which extend along the outer edges of the corresponding Coriolis masses 711 and 713. The radial suspenders 751 are stiff in the radial direction but flexible in the tangential direction, so they flexibly accommodate the simultaneous tangential movement of Coriolis masses 711–714 in the second z-axis secondary oscillation mode. The peripheral suspenders 741 synchronize this tangential oscillation and they may be joined together to form a frame around the Coriolis masses 711–714 which lie inside of them.

More generally, in any embodiment where the second primary oscillation mode shown in FIG. 3d is used, the synchronization suspension structure may comprise, around each quartet center point and optionally extending towards the periphery of the Coriolis mass quartet, a suspension arrangement which comprises radially flexible springs coupled in series with tangentially flexible springs, which are anchored to the corresponding central anchor point and coupled to each mass in the corresponding Coriolis mass quartet. The Coriolis masses may optionally be interconnected with radial suspenders coupled in series with peripheral suspenders so that all four Coriolis masses in the quartet are inclined to move simultaneously in the radial and in the tangential direction.

The invention claimed is:

1. A microelectromechanical gyroscope, comprising:
 a first Coriolis mass quartet which in its rest position lies in a device plane;
 a first quartet center point where a lateral axis crosses a first transversal axis orthogonally in the device plane, wherein a first central anchor point is located at the first quartet center point, wherein the first Coriolis mass quartet comprises a first, second, third and fourth Coriolis mass which are in their rest positions symmetrically arranged around the first quartet center point so that the first and second Coriolis masses are aligned on the lateral axis, and the third and fourth Coriolis masses are aligned on the first transversal axis;
 a second Coriolis mass quartet which in its rest position lies in the device plane;
 a second quartet center point where the lateral axis crosses a second transversal axis orthogonally in the device plane, wherein a second central anchor point is located at the second quartet center point, wherein the second Coriolis mass quartet comprises a fifth, sixth, seventh and eighth Coriolis mass which are in their rest positions symmetrically arranged around the second quartet center point so that the fifth and sixth Coriolis masses are aligned on the lateral axis, and the seventh and eighth Coriolis masses are aligned on the second transversal axis;
 a third transversal axis which crosses the lateral axis substantially halfway between the first quartet center point and the second quartet center point, wherein the rest positions of the fifth, sixth, seventh and eighth Coriolis masses in relation to the second quartet center point are the same as the rest positions of the first, second, third and fourth Coriolis masses, respectively, in relation to the first quartet center point, so that the third and the seventh Coriolis masses are located on a first side of the lateral axis, and the fourth and the eighth Coriolis masses are located on a second side of the lateral axis, and the second and fifth Coriolis masses are adjacent to each other on opposing sides of the third transversal axis;

a first central suspension arrangement for suspending the first Coriolis mass quartet from the first central anchor point, wherein the first central suspension arrangement is centered around the first quartet center point inside the first Coriolis mass quartet, so that the first central suspension arrangement is closer to the first quartet center point than the first Coriolis mass quartet is;

a second central suspension arrangement for suspending the second Coriolis mass quartet from the second central anchor point, wherein the second central suspension arrangement is centered around the second quartet center point inside the second Coriolis mass quartet, so that the second central suspension arrangement is closer to the second quartet center point than the second Coriolis mass quartet is;

a first and a second elongated mass element which are transversally aligned on opposing sides of the lateral axis outside of the first Coriolis mass, so that the first and second elongated mass elements are further away from the first quartet center point than the first Coriolis mass is;

third and fourth elongated mass elements which are transversally aligned on opposing sides of the lateral axis outside of the second Coriolis mass, so that the third and fourth elongated mass elements are further away from the first quartet center point than the second Coriolis mass is;

fifth and sixth elongated mass elements which are transversally aligned on opposing sides of the lateral axis outside of the fifth Coriolis mass, so that the fifth and sixth elongated mass elements are further away from the second quartet center point than the fifth Coriolis mass is;

seventh and eighth elongated mass elements which are transversally aligned on opposing sides of the lateral axis outside of the sixth Coriolis mass, so that the seventh and eighth elongated mass elements are further away from the second quartet center point than the sixth Coriolis mass is, wherein said alignments occur when each elongated mass element is in its rest position, wherein each of the first, second, third, fourth, fifth, sixth, seventh and eighth elongated mass elements has a first end which is closer to the lateral axis and a second end which is further away from the lateral axis, and the first end of each of these elongated mass elements is attached with a connecting element to the corresponding Coriolis mass which lies adjacent on the inside of said each elongated mass element;

a ninth, tenth, eleventh and twelfth elongated mass element;

first and second elongated synchronization bars which cross the third transversal axis, wherein the first elongated synchronization bar is laterally aligned with the ninth elongated mass element on opposing sides of the first transversal axis outside of the third Coriolis mass, so that the ninth elongated mass element and the first elongated synchronization bar are further away from the first quartet center point than the third Coriolis mass is, and the first elongated synchronization bar is laterally aligned with the tenth elongated mass element on opposing sides of the second transversal axis outside of the seventh Coriolis mass, so that the tenth elongated mass element and the first elongated synchronization bar are further away from the second quartet center point than the seventh Coriolis mass is, and the second elongated synchronization bar is laterally aligned with the eleventh elongated mass element on opposing sides of the first transversal axis outside of the fourth Coriolis mass, so that the eleventh elongated mass element and the second elongated synchronization bar are further away from the first quartet center point than the fourth Coriolis mass is, and the second elongated synchronization bar is laterally aligned with the twelfth elongated mass element on opposing sides of the second transversal axis outside of the eighth Coriolis mass, so that the twelfth elongated mass element and the second elongated synchronization bar are further away from the second quartet center point than the eighth Coriolis mass is, wherein said alignments occur when each elongated mass element and elongated synchronization bar is in its rest position, wherein the ninth and eleventh elongated mass elements have a first end which is closer to the first transversal axis and a second end which is further away from the first transversal axis, and the tenth and twelfth elongated mass elements have a first end which is closer to the second transversal axis and a second end which is further away from the second transversal axis, and the first end of each of these elongated mass elements is attached with a connecting element to the corresponding Coriolis mass which lies adjacent on the inside of said each elongated mass element, and wherein the first and second elongated synchronization bars have a first end which is closer to the first transversal axis and a second end which is closer to the second transversal axis, and the first and second ends of each elongated synchronization bar is attached with a connecting element to the corresponding Coriolis mass which lies adjacent on the inside of said first or second end;

a set of peripheral anchor points outside of the first and second Coriolis mass quartets, so that the peripheral anchor points are further away from each quartet center point than the corresponding Coriolis mass quartet is wherein each elongated mass element is suspended from a respective peripheral anchor point by a mass element suspension arrangement which allows said each elongated mass element to undergo rotational motion both in the device plane and out of the device plane around its second end, and each elongated synchronization bar is suspended from a respective peripheral anchor point by a synchronization bar suspension arrangement which allows said each elongated synchronization bar to undergo rotational motion both in the device plane and out of the device plane around its midpoint;

one or more drive transducers for setting the first and second Coriolis mass quartets, each of the elongated mass elements and both of the elongated synchronization bars into primary oscillating motion; and one or more sense transducers for detecting a secondary oscillating motion of the first and second Coriolis mass quartets, or the elongated mass elements, or the elongated synchronization bars, induced by the Coriolis force when the gyroscope undergoes angular rotation.

2. The microelectromechanical gyroscope according to claim 1, wherein the lengths of the first, second, third, fourth, fifth, sixth, seventh and eighth elongated mass elements in the transversal direction are all substantially equal, and the lengths of the ninth, tenth, eleventh and twelfth elongated mass elements in the lateral direction are all substantially equal to the length of the first elongated mass element in the transversal direction, and the lengths of the first and second elongated synchronization bars in the lateral direction are both substantially twice as much as the length of the first elongated mass element in the transversal direction.

3. The microelectromechanical gyroscope according to claim 1, wherein the third elongated mass element is either attached to or integral with the fifth elongated mass element so that they together form a first unitary elongated mass element and the fourth elongated mass element is either attached to or integral with the sixth elongated mass element so that they together form a second unitary elongated mass element.

4. A microelectromechanical gyroscope, comprising:
a Coriolis mass quartet which in its rest position lies in a device plane;
a quartet center point where a lateral axis crosses a transversal axis orthogonally in the device plane, wherein a central anchor point is located at the quartet center point and the Coriolis mass quartet comprises four Coriolis masses which are in their rest positions symmetrically arranged around the quartet center point so that the first and second Coriolis masses in the Coriolis mass quartet are aligned on the lateral axis in their rest position and the third and fourth Coriolis masses in the Coriolis mass quartet are aligned on the transversal axis in their rest position;
a central suspension arrangement for suspending the Coriolis mass quartet from the central anchor point, wherein the central suspension arrangement is centered around the quartet center point inside the Coriolis mass quartet, so that the central suspension arrangement is closer to the quartet center point than the Coriolis mass quartet is;
a first and a second elongated mass element which are transversally aligned on opposing sides of the lateral axis outside of the first Coriolis mass, so that the first and second elongated mass elements are further away from the quartet center point than the first Coriolis mass is;
third and fourth elongated mass elements which are transversally aligned on opposing sides of the lateral axis outside of the second Coriolis mass, so that the third and fourth elongated mass elements are further away from the quartet center point than the second Coriolis mass is;
fifth and sixth elongated mass elements which are laterally aligned on opposing sides of the transversal axis outside of the third Coriolis mass, so that the fifth and sixth elongated mass elements are further away from the quartet center point than the third Coriolis mass is;
seventh and eighth elongated mass elements which are laterally aligned on opposing sides of the transversal axis outside of the fourth Coriolis mass, so that the seventh and eighth elongated mass elements are further away from the quartet center point than the fourth Coriolis mass is, wherein a first end of the first elongated mass element is adjacent to a first end of the second elongated mass element, a first end of the third elongated mass element is adjacent to a first end of the fourth elongated mass element, a first end of the fifth elongated mass element is adjacent to a first end of the sixth elongated mass element, a first end of the seventh elongated mass element is adjacent to a first end of the eighth elongated mass element, and each of the said elongated mass elements has a second end which is opposite to the first, and the first end of each of these elongated mass elements is attached with a connecting element to the corresponding Coriolis mass which lies adjacent on the inside of said elongated mass element;
a set of peripheral anchor points outside of the Coriolis mass quartet, so that the peripheral anchor points are further away from the quartet center point than the Coriolis mass quartet is, wherein each elongated mass element is suspended from a respective peripheral anchor point by a mass element suspension arrangement which allows said each elongated mass element to undergo rotational motion both in the device plane and out of the device plane around its second end;
one or more drive transducers for setting the Coriolis mass quartet and each of the elongated mass elements into primary oscillating motion; and
one or more sense transducers for detecting a secondary oscillating motion of the first Coriolis mass quartet or the elongated mass elements, induced by the Coriolis force when the gyroscope undergoes angular rotation.

5. The microelectromechanical gyroscope according to claim 4, wherein the lengths of the first, second, third and fourth elongated mass elements in the transversal direction are all substantially equal, and the lengths of the fifth, sixth, seventh and eighth elongated mass elements in the lateral direction are all substantially equal to the length of the first elongated mass element in the transversal direction.

* * * * *